(12) United States Patent
Kim

(10) Patent No.: US 11,304,174 B2
(45) Date of Patent: Apr. 12, 2022

(54) METHOD AND APPARATUS FOR PERFORMING POSITIONING IN NEXT GENERATION WIRELESS NETWORK

(71) Applicant: KT CORPORATION, Gyeonggi-do (KR)

(72) Inventor: Ki-tae Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/040,396

(22) PCT Filed: Mar. 22, 2019

(86) PCT No.: PCT/KR2019/003362
§ 371 (c)(1),
(2) Date: Sep. 22, 2020

(87) PCT Pub. No.: WO2019/182401
PCT Pub. Date: Sep. 26, 2019

(65) Prior Publication Data
US 2021/0250892 A1    Aug. 12, 2021

(30) Foreign Application Priority Data

| Mar. 23, 2018 | (KR) | ......... | 10-2018-0034129 |
| Mar. 30, 2018 | (KR) | ......... | 10-2018-0037433 |
| Mar. 21, 2019 | (KR) | ......... | 10-2019-0032410 |

(51) Int. Cl.
*H04W 24/00* (2009.01)
*H04W 64/00* (2009.01)
*H04L 5/00* (2006.01)
*H04W 56/00* (2009.01)

(52) U.S. Cl.
CPC ......... *H04W 64/003* (2013.01); *H04L 5/0005* (2013.01); *H04L 5/0051* (2013.01); *H04W 56/0065* (2013.01)

(58) Field of Classification Search
CPC ............ H04W 64/003; H04W 56/0065; H04L 5/0051; H04L 5/0005
USPC ...................................... 455/456.1
See application file for complete search history.

(56) References Cited

U.S. PATENT DOCUMENTS

| 2012/0083278 | A1* | 4/2012 | Kazmi | ................. | H04W 36/06 455/440 |
| 2012/0195286 | A1 | 8/2012 | Kim et al. | | |
| 2013/0295958 | A1* | 11/2013 | Siomina | ............... | G01S 5/0205 455/456.1 |
| 2014/0349677 | A1* | 11/2014 | Xiao | ...................... | H04W 4/02 455/456.1 |

(Continued)

OTHER PUBLICATIONS

ITL, "Support of OTDOA in NB-IoT", R1-167752, 3GPP TSG RAN WG1 Meeting #86, Gothenburg, Sweden Aug. 22-26, 2016.

(Continued)

*Primary Examiner* — Tanmay K Shah
(74) *Attorney, Agent, or Firm* — IP Legal Services, LLC

(57) ABSTRACT

Provided are methods and devices for performing positioning in a next-generation wireless network. The method for performing positioning by a user equipment (UE) may include identifying configuration information for a transmission pattern of a positioning reference signal (PRS) and receiving the positioning reference signal based on the configuration information for the transmission pattern.

12 Claims, 35 Drawing Sheets

(56) References Cited

U.S. PATENT DOCUMENTS

| | | |
|---|---|---|
| 2017/0289831 A1* | 10/2017 | Park .................. G01S 5/0236 |
| 2017/0339660 A1* | 11/2017 | Kazmi ................ H04B 17/309 |
| 2017/0374638 A1 | 12/2017 | Han et al. |
| 2017/0374640 A1 | 12/2017 | Kim et al. |
| 2019/0037529 A1* | 1/2019 | Edge ...................... H04L 1/04 |
| 2019/0387491 A1 | 12/2019 | Han et al. |

OTHER PUBLICATIONS

Huawei et al., "Clarifications on OTDOA subframe configuration and muting", R1-1701751, 3GPP TSG RAN WG1 Meeting #88, Athens, Greece, Feb. 13-17, 2017, pp. 1-2.

Nokia et al., "OTDOA Positioning in FeMTC", R1-1701859, 3GPP TSG RAN WG1 Meeting #88, Athens, Greece, Feb. 13-17, 2017.

Pantech, "Discussion on collision avoidance between CSI-RS and PRS", R1-110753, 3GPP TSG RA WG1 Meeting #64, Taipei, Feb. 21-25, 2011, pp. 1-5.

3GPP, "3rd Generation Partnership Project; Technical Specification Group Radio Access Network; Study on Indoor Positioning Enhancements for UTRA and LTE (Release 13)", 3GPP TR 37.857 V1.0.0, Sep. 2015, pp. 1-82.

MCC Support, "Final Report of 3GPP TSG RAN WG1 #88 v1.0.0 (Athens, Greece, Feb. 13-17, 2017)", R1-1704172, 3GPP TSG RAN WG1 Meeting #88bis, Spokane, USA, Apr. 3-7, 2017, pp. 1-152.

* cited by examiner

FIG.16

PRS-Info

```
-- ASN1 START

PRS-Info : := SEQUENCE {
        prs-Bandwidth          ENUMERATED { n6, n15, n25, n50, n75, n100, ... },
        prs-ConfigurationIndex INTERGER (0..4095)
        numDL-Frames           ENUMERATED { sf-1, sf-2, sf-4, sf-6, ..., sf-add-v1420},
        ...,
        prs-MutingInfo-r9      CHOICE {

-- ASN1STOP
```

FIG.29

PRS-Info

```
-- ASN1 START

PRS-Info : := SEQUENCE {
        prs-Bandwidth          ENUMERATED { n6, n15, n25, n50, n75, n100, ... },
        prs-ConfigurationIndex  INTERGER (0..4095)
        numDL-Frames           ENUMERATED { sf-1, sf-2, sf-4, sf-6, ..., sf-add-v1420},
        ...,
        prs-MutingInfo-r9      CHOICE {
        prs-beam_V

-- ASN1STOP
```

FIG.31

PRS-Info

```
-- ASN1 START

PRS-Info : := SEQUENCE {
        prs-Bandwidth           ENUMERATED { n6, n15, n25, n50, n75, n100, ... },
        prs-ConfigurationIndex  INTERGER (0..4095)
        numDL-Frames            ENUMERATED { sf-1, sf-2, sf-4, sf-6, ..., sf-add-v1420},
        ... ,
        prs-MutingInfo-r9       CHOICE {
        prs_H_mapping
        prs_V_mapping

-- ASN1STOP
```

METHOD AND APPARATUS FOR PERFORMING POSITIONING IN NEXT GENERATION WIRELESS NETWORK

CROSS REFERENCE TO RELATED APPLICATIONS

This application is a National Stage Patent Application of PCT International Patent Application No. PCT/KR2019/003362 (filed on Mar. 22, 2019) under 35 U.S.C. § 371, which claims priority to Korean Patent Application Nos. 10-2018-0034129 (filed on Mar. 23, 2018), 10-2018-0037433 (filed on Mar. 30, 2018), and 10-2019-0032410 (filed on Mar. 21, 2019), the teachings of which are incorporated herein in their entireties by reference.

TECHNICAL FIELD

The disclosure proposes methods and devices for measuring the position of a UE in a next-generation wireless access network (hereinafter, "new radio (NR)").

BACKGROUND ART

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE), but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE.

In particular, there is a demand for developing a flexible design for positioning reference signals (PRSs) to be able to support a high resolution and various use cases related to UE positioning required in NR.

DETAILED DESCRIPTION OF THE DISCLOSURE

Technical Problem

The disclosure aims to provide methods for configuring transmission patterns for positioning reference signals to perform positioning in next-generation wireless networks.

Technical Solution

To achieve the foregoing objectives, according to an embodiment a method may be provided for performing positioning by a user equipment (UE). The method may include identifying configuration information for a transmission pattern of a positioning reference signal (PRS) and receiving the positioning reference signal based on the configuration information for the transmission pattern.

According to an embodiment a method may be provided for performing positioning by a base station. The method may include configuring configuration information for a transmission pattern of a positioning reference signal (PRS) and transmitting the positioning reference signal based on the configuration information for the transmission pattern.

According to another embodiment, a UE may be provided for performing positioning. The UE may include a controller identifying configuration information for a transmission pattern of a positioning reference signal (PRS) and a receiver receiving the positioning reference signal based on the configuration information for the transmission pattern.

According to still another embodiment, a base station may be provided for performing positioning. The base station may include a controller configuring configuration information for a transmission pattern of a positioning reference signal (PRS) and a transmitter transmitting the positioning reference signal based on the configuration information for the transmission pattern.

Advantageous Effects

According to the disclosure, methods may be provided for configuring transmission patterns for positioning reference signals to perform positioning in next-generation wireless networks.

BRIEF DESCRIPTION OF DRAWINGS

FIG. 16 is a view illustrating an example of configuration information of a positioning reference signal according to an embodiment;

FIG. 29 is a view illustrating an example of configuration information of a positioning reference signal including beam information according to an embodiment;

FIG. 31 is a view illustrating an example of configuration information of a positioning reference signal including horizontal information and vertical information according to an embodiment;

MODE FOR CARRYING OUT THE INVENTION

Figure 1:
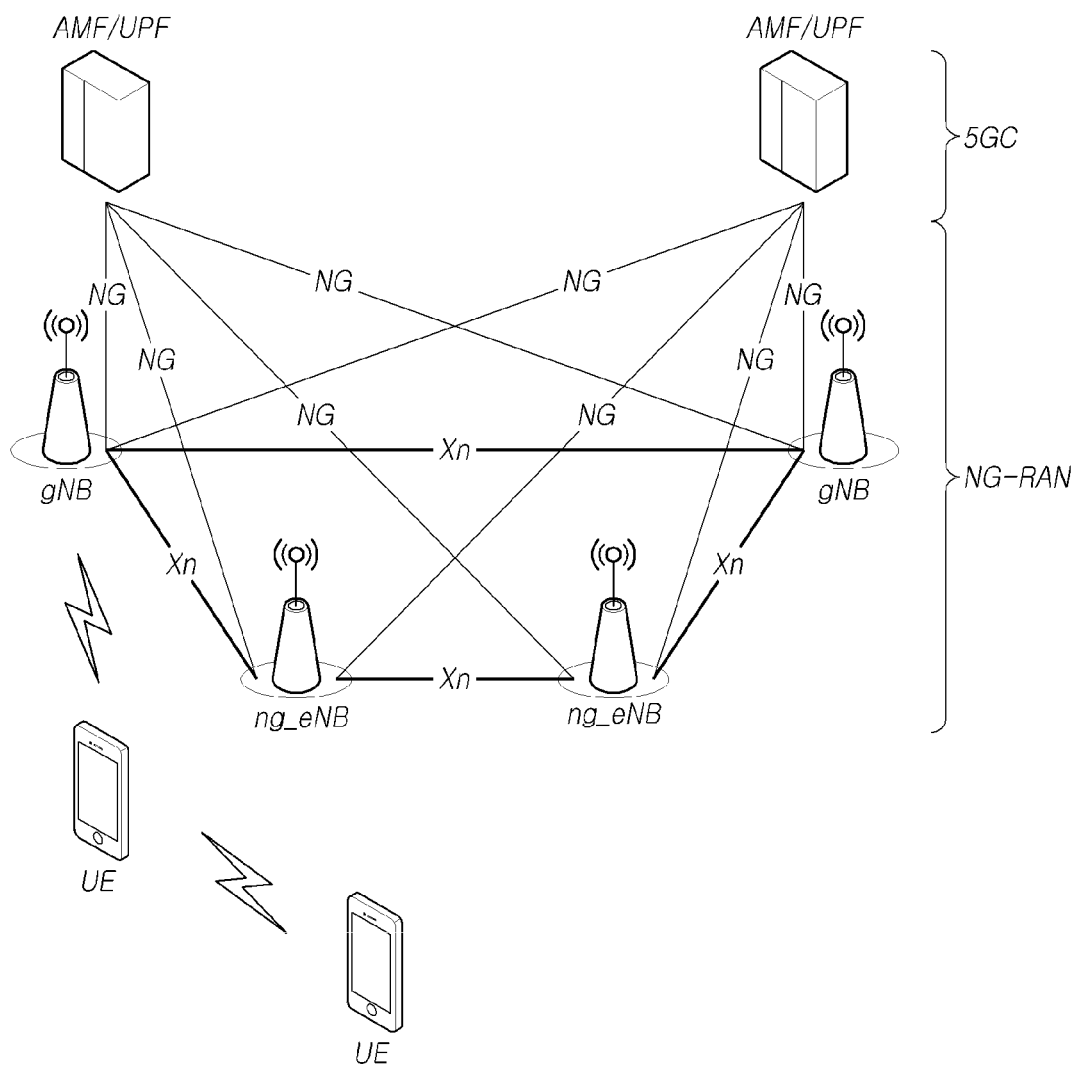
FIG. 1 is a view schematically illustrating an NR wireless communication system in accordance with embodiments of the disclosure.

Hereinafter, some embodiments of the disclosure will be described in detail with reference to the accompanying illustrative drawings. In the drawings, like reference numerals are used to denote like elements throughout the drawings, even if they are shown on different drawings. Further, in the following description of the disclosure, a detailed description of known functions and configurations incorporated herein will be omitted when it may make the subject matter of the disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the disclosure. Each of these terminologies is not used to define an essence, order or sequence of a corresponding component but used merely to distinguish the corresponding component from other component(s). In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression. Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces.

The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
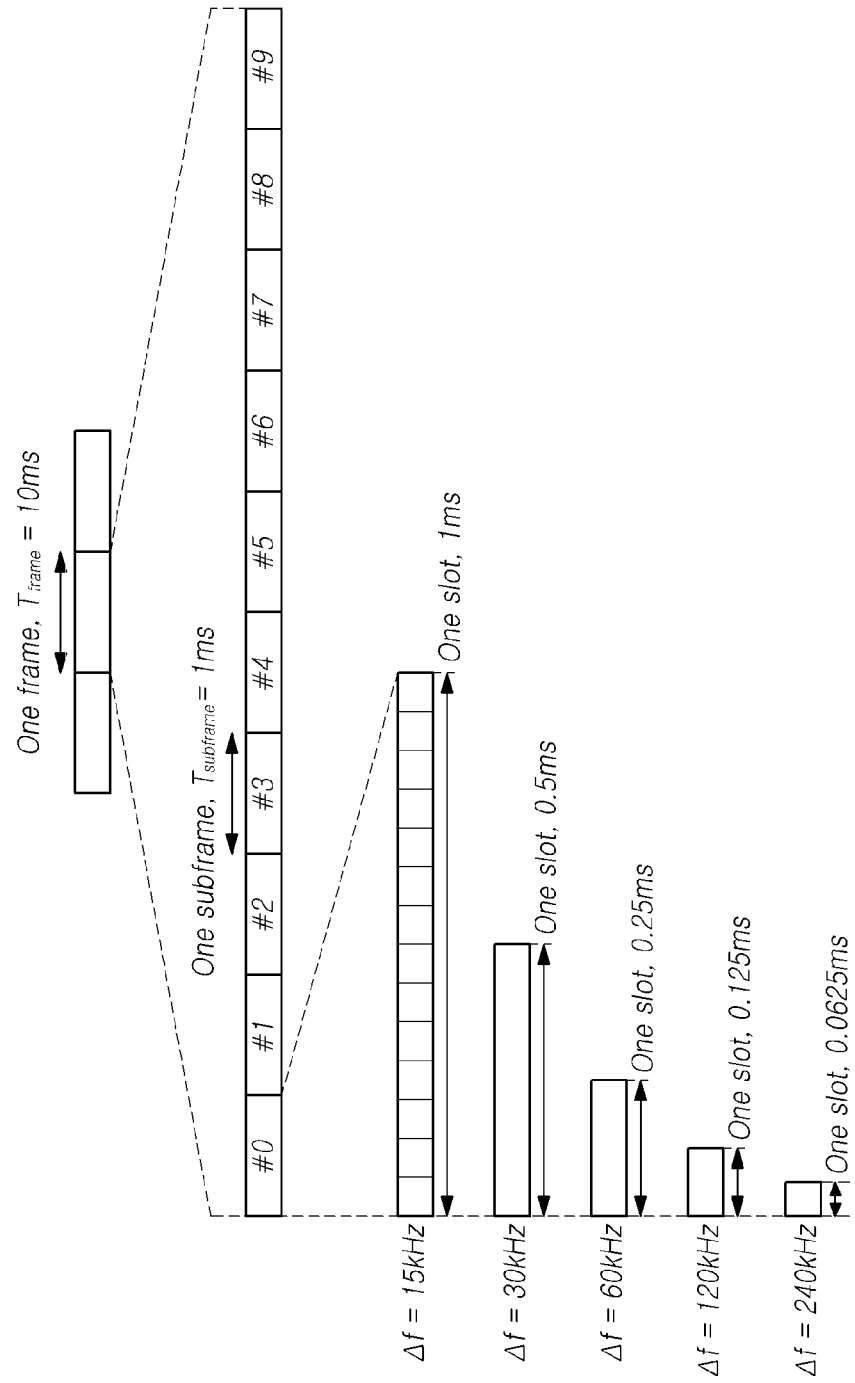
FIG. 2 is a view schematically illustrating a frame structure in an NR system in accordance with embodiments of the disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
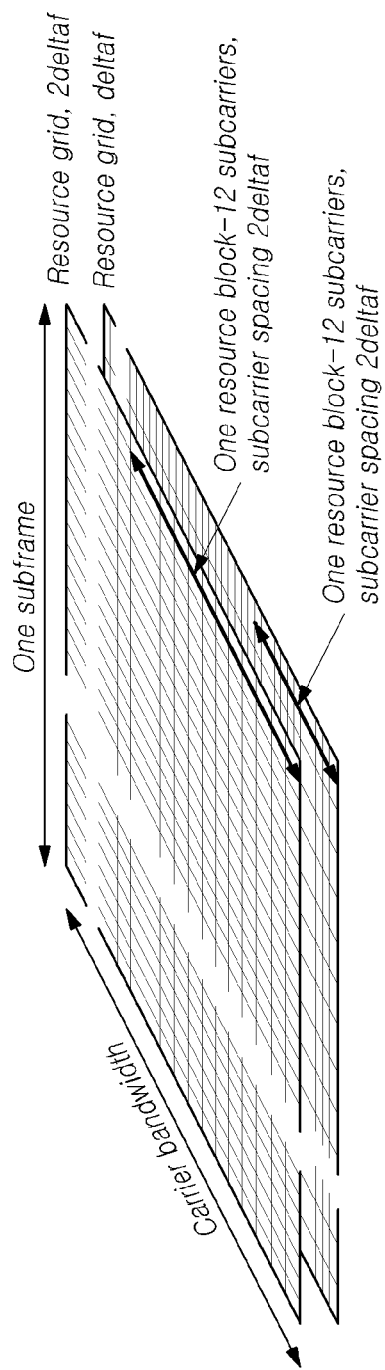
FIG. 3 is a view for explaining resource grids supported by a radio access technology in accordance with embodiments of the disclosure.

FIG. 3 illustrates resource grids supported by a radio access technology in accordance with embodiments of the disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
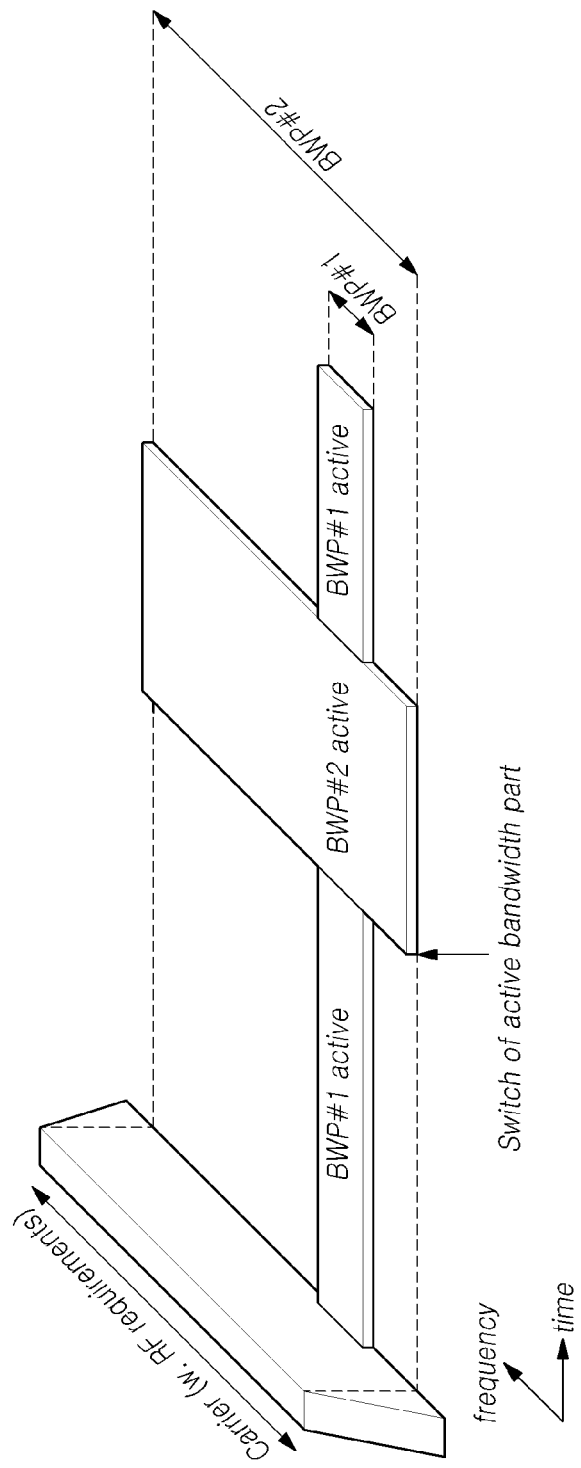
FIG. 4 is a view for explaining bandwidth parts supported by a radio access technology in accordance with embodiments of the disclosure.

FIG. 4 illustrates bandwidth parts supported by a radio access technology in accordance with embodiments of the disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
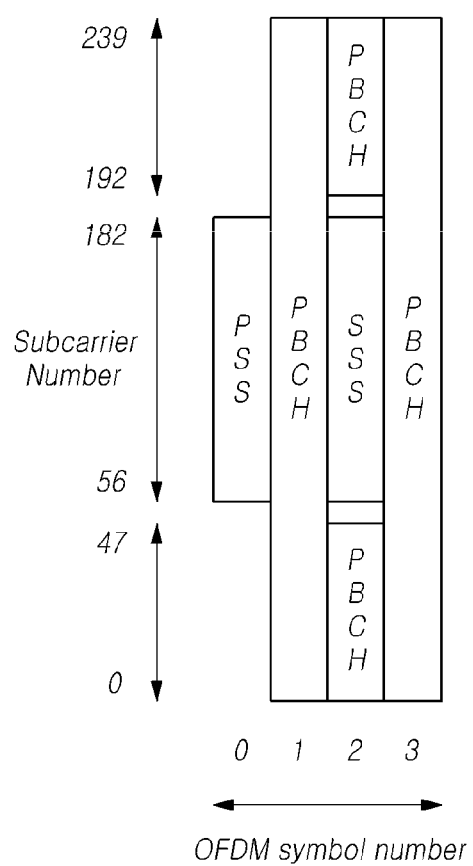
FIG. 5 is a view illustrating an example of a synchronization signal block in a radio access technology in accordance with embodiments of the disclosure.

FIG. 5 illustrates an example of a synchronization signal block in a radio access technology in accordance with embodiments of the disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB 1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
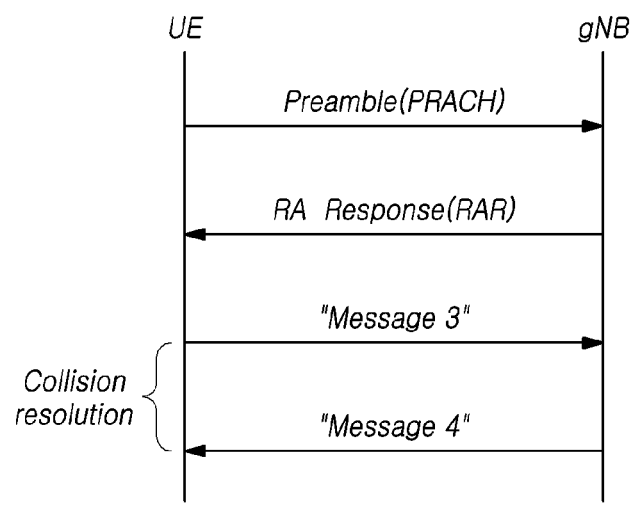
FIG. 6 is a signal diagram for explaining a random access procedure in a radio access technology in accordance with embodiments of the disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station.

The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
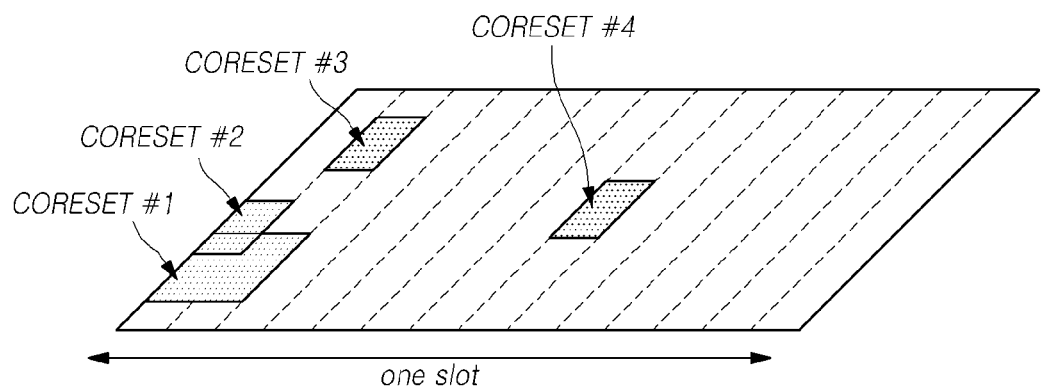
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

Recently, the 3GPP has approved the "Study on New Radio Access Technology", which is a study item for research on next-generation/5G radio access technology. On the basis of the Study on New Radio Access Technology, in RAN WG1, discussions have been in progress on frame structures, channel coding and modulation, waveforms, multiple access schemes, and the like for the NR. It is required to design the NR not only to provide an improved data transmission rate, but also to meet various QoS requirements for each detailed and specific usage scenario, compared to the LTE/LTE-Advanced.

In particular, an enhanced mobile broadband (eMBB), massive machine-type communication (mMTC), and ultra-reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a subframe has been defined as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS). As a result, a short time domain scheduling interval may be configured for UL/DL data transmission or reception based on the mini-slot. Also, a long time domain scheduling interval may be configured for the UL/DL data transmission or reception by slot aggregation. Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, it may be difficult to satisfy latency requirements. To this end, a mini-slot may be defined to be made up of fewer OFDM symbols than the slot. Thus the scheduling for the latency critical data, such as the URLLC, may be performed based on the mini-slot.

Figure 8:
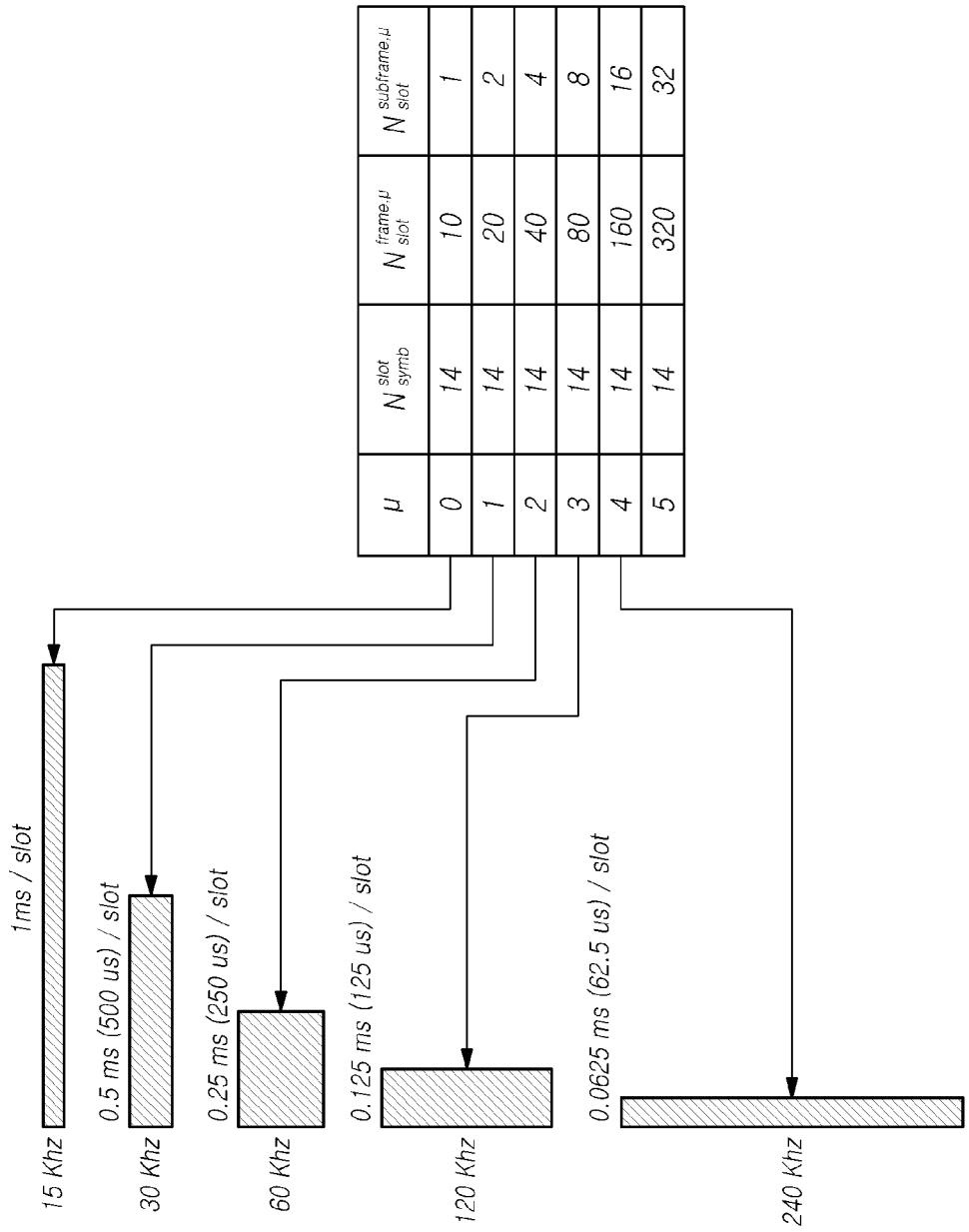
FIG. 8 is a view illustrating an example of symbol level alignment among different subcarrier spacings (SCSs) in accordance with embodiments of the disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, because of different SCSs or different TTI lengths are defined in the NR, related technologies have been developed for satisfying requirements of each of the URLLC and the eMBB.

Meanwhile, channel state information (CSI) provides a channel state for a network using a channel state indicator, instead of channel estimation using a typical cell-specific RE (reference signal) (CRS). It is cell-specific, but configured by RRC signaling of a UE. A definition of Channel State Information Reference Signal (CSI-RS) was introduced in LTE Release 10. The CSI-RS is used for allowing a UE to obtain channel state information by estimating demodulation reference signals.

Figure 9:
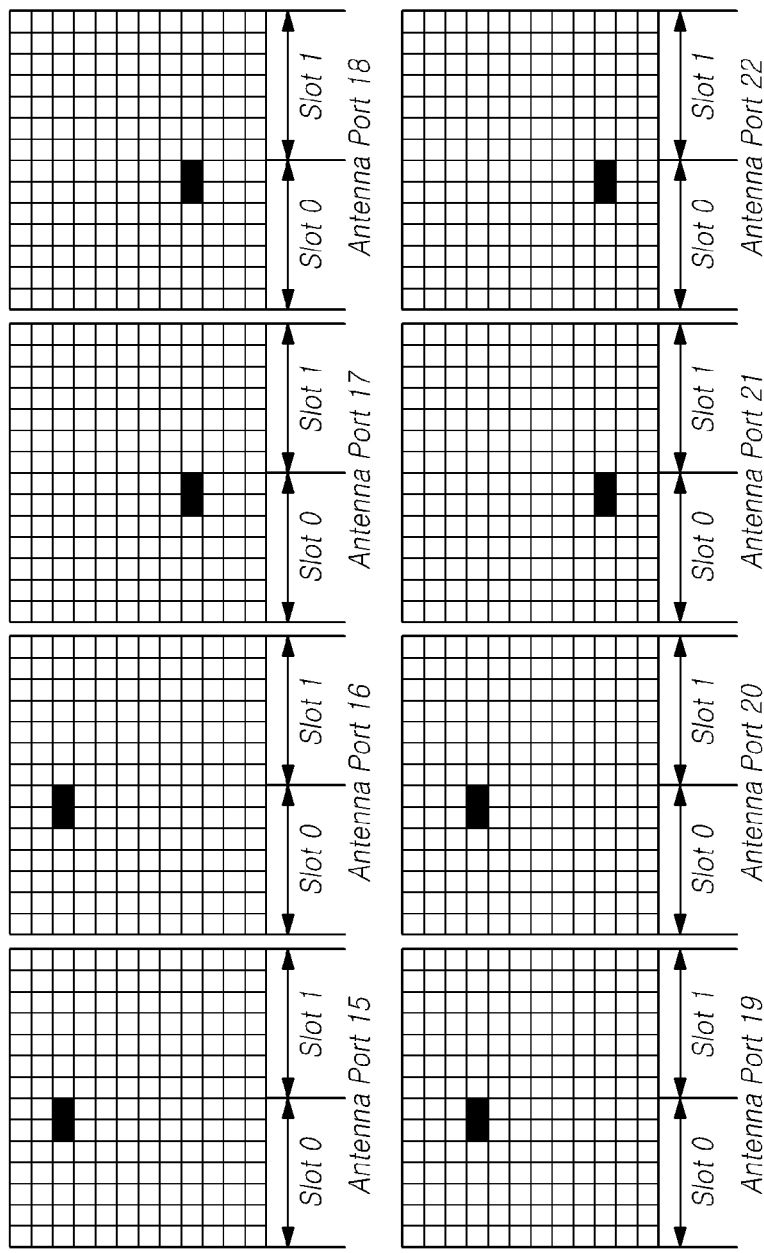
FIG. 9 is a view illustrating an LTE-A CSI-RS structure.

In LTE Rel-8/9, a cell is defined to support a maximum of 4 CRSs. As the LTE evolves from LTE Rel-8/9 to LTE-A (Rel-10), it has been necessary for the CSI to be extended for enabling a cell reference signal to support a maximum 8-layer transmission. Here, antenna ports of 15-22 are allocated as represented in FIG. 9, a transmission periodicity and mapping for resource allocation is determined through RRC configuration. Table 2 defines a mapping method through CSI-RS configuration for normal CP.

TABLE 2

Mapping from CSI reference signal configuration to (k', l') for normal cyclic

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame Structure type 1 and 2 | | | | | | |
| 0 | (9,5) | 0 | (9,5) | 0 | (9,5) | 0 |
| 1 | (11,2) | 1 | (11,2) | 1 | (11,2) | 1 |
| 2 | (9,2) | 1 | (9,2) | 1 | (9,2) | 1 |
| 3 | (7,2) | 1 | (7,2) | 1 | (7,2) | 1 |
| 4 | (9,5) | 1 | (9,5) | 1 | (9,5) | 1 |
| 5 | (8,5) | 0 | (8,5) | 0 | | |
| 6 | (10,2) | 1 | (10,2) | 1 | | |
| 7 | (8,2) | 1 | (8,2) | 1 | | |
| 8 | (6,2) | 1 | (6,2) | 1 | | |
| 9 | (8,5) | 1 | (8,5) | 1 | | |
| 10 | (3,5) | 0 | | | | |
| 11 | (2,5) | 0 | | | | |
| 12 | (5,2) | 1 | | | | |
| 13 | (4,2) | 1 | | | | |
| 14 | (3,2) | 1 | | | | |
| 15 | (2,2) | 1 | | | | |
| 16 | (1,2) | 1 | | | | |
| 17 | (0,2) | 1 | | | | |
| 18 | (3,5) | 1 | | | | |
| 19 | (2,5) | 1 | | | | |
| Frame structure type 2 only | | | | | | |
| 20 | (11,1) | 1 | (11,1) | 1 | (11,1) | 1 |
| 21 | (9,1) | 1 | (9,1) | 1 | (9,1) | 1 |
| 22 | (7,1) | 1 | (7,1) | 1 | (7,1) | 1 |
| 23 | (10,1) | 1 | (10,1) | 1 | | |
| 24 | (8,1) | 1 | (8,1) | 1 | | |
| 25 | (6,1) | 1 | (6,1) | 1 | | |
| 26 | (5,1) | 1 | | | | |
| 27 | (4,1) | 1 | | | | |
| 28 | (3,1) | 1 | | | | |
| 29 | (2,1) | 1 | | | | |
| 30 | (1,1) | 1 | | | | |
| 31 | (0,1) | 1 | | | | |

In the NR, the X-port CSI-RS has been finally defined as being allocated to N consecutive/non-consecutive OFDM symbols. Here, the X-ports are CSI-RS ports, where X is a maximum of 32. The CSI-RS is allocated over the N symbols, where N is a maximum of 4.

Figure 10:
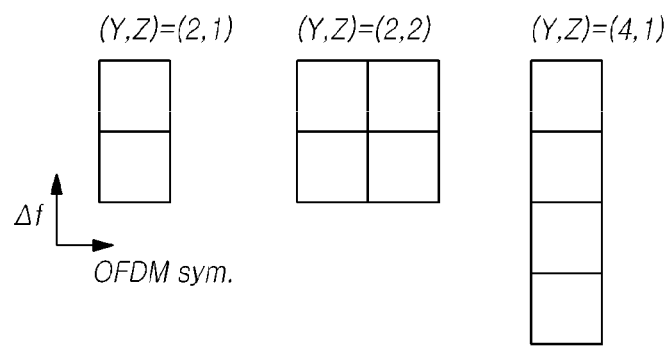
FIG. 10 is a view illustrating NR component CSI-RS RE patterns.

Basically, the CSI-RS has three component resource element (RE) patterns in total as illustrated in FIG. 10. Y and Z represent lengths on the time and frequency axes of CSI-RS RE patterns, respectively.

(Y,Z)∈{(2,1),(2,2),(4,1)}

Figure 11:
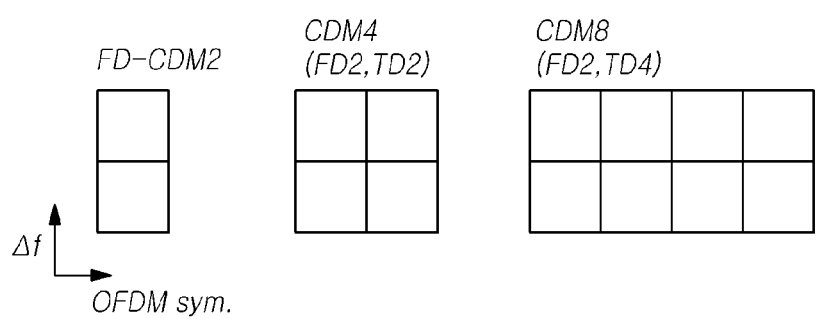
FIG. 11 is a view illustrating NR CDM patterns.

Further, three CDM patterns in total are supported in the NR as illustrated in FIG. 11.

FD-CDM2, CDM4(FD2,TD2), CDM8(FD2,TD4)

Here, following Tables 3 to 6 represent spreading sequences allocated to each CDM pattern in actual.

TABLE 3

The sequences $w_f(k')$ and $w_t(l')$ for CDMType equal to 'no CDM'

| Index | $w_f(k')$ | $w_t(l')$ |
|---|---|---|
| 0 | 1 | 1 |

TABLE 4

The sequences $w_f(k')$ and $w_t(l')$ for CDMType equal to 'FD-CDM2'

| Index | $w_f(k')$ | $w_t(l')$ |
|---|---|---|
| 0 | [+1 +1] | 1 |
| 1 | [+1 −1] | 1 |

TABLE 5

The sequences $w_f(k')$ and $w_t(l')$ for CDMType equal to 'CDM4'

| Index | $w_f(k')$ | $w_t(l')$ |
|---|---|---|
| 0 | [+1 +1] | [+1 +1] |
| 1 | [+1 −1] | [+1 +1] |
| 2 | [+1 +1] | [+1 −1] |
| 3 | [+1 −1] | [+1 −1] |

TABLE 6

The sequences $w_f(k')$ and $w_t(l')$ for CDMType equal to 'CDM8'

| Index | $w_f(k')$ | $w_t(l')$ |
|---|---|---|
| 0 | [+1 +1] | [+1 +1 +1 +1] |
| 1 | [+1 −1] | [+1 +1 +1 +1] |
| 2 | [+1 +1] | [+1 −1 +1 −1] |
| 3 | [+1 −1] | [+1 −1 +1 −1] |
| 4 | [+1 +1] | [+1 +1 −1 −1] |
| 5 | [+1 −1] | [+1 +1 −1 −1] |
| 6 | [+1 +1] | [+1 −1 −1 +1] |
| 7 | [+1 −1] | [+1 −1 −1 +1] |

Figure 12:
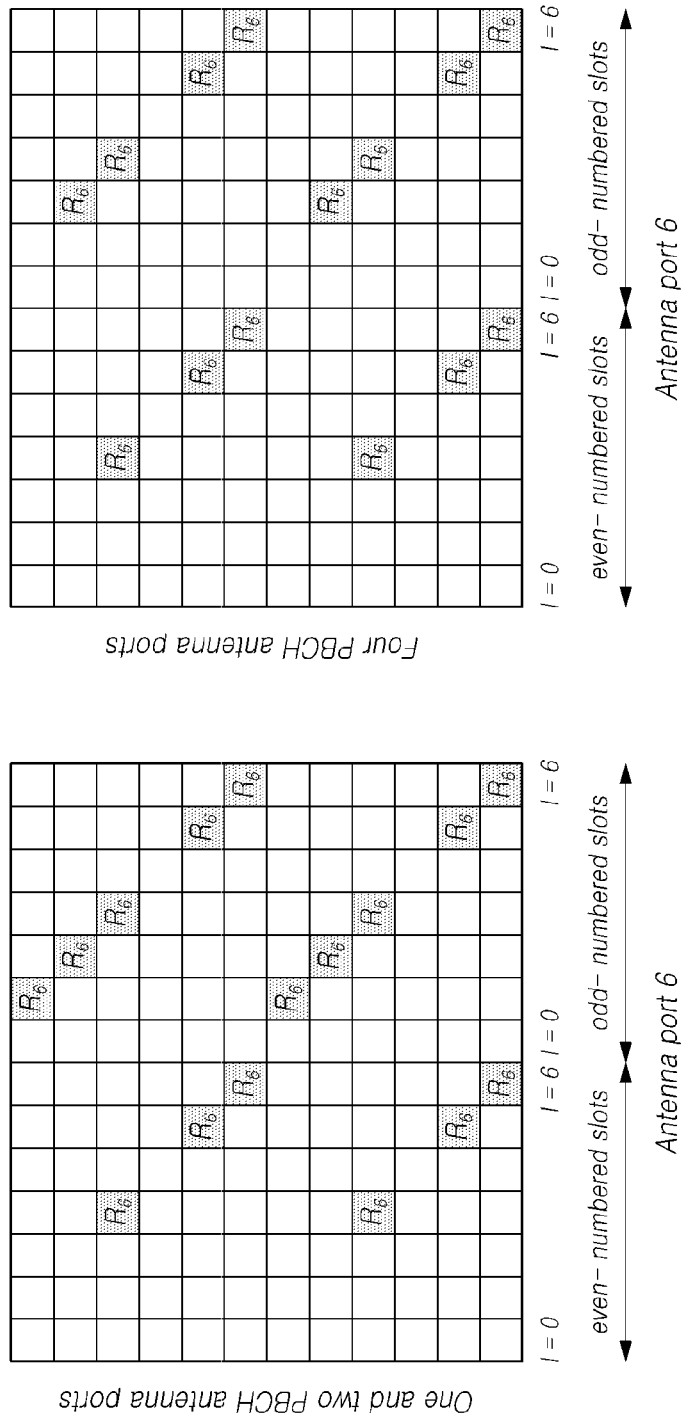
FIG. 12 is a view illustrating mapping of positioning reference signals in case of normal cyclic prefix.

In the LTE, higher-layer signaling may be transmitted via antenna port 6 as illustrated in FIG. 12. Through this, a UE performs position measurement. Basically, a PRS is transmitted to a pre-defined area through higher-layer signaling parameter configuration.

ΔPRS: subframe offset

TPRS: periodicity, 160, 320, 640, 1280 subframes

NPRS: duration (=No. of consecutive subframes), 1, 2, 4, 6 subframes

Basically, the Positioning Reference signal (PRS) uses a pseudo random sequence, that is, a quasi-orthogonal characteristic sequence. That is, PRS sequences that overlap over code may be separated using this orthogonal characteristic. In frequency domain, as shown in FIG. 12, a total of 6 cells including 5 neighboring cells may be orthogonally allocated using frequency reuse factor=6. Here, a physical cell ID ("PCI") is basically used as an offset value for a frequency domain position of a PRS RE.

Finally, since a collision occurs in case all target cells configure an identical PRS transmission interval in the time domain, PRS transmission may be performed at an orthogonal time interval between specific cells or cell groups by configuring a muting interval per cell.

Figure 13:
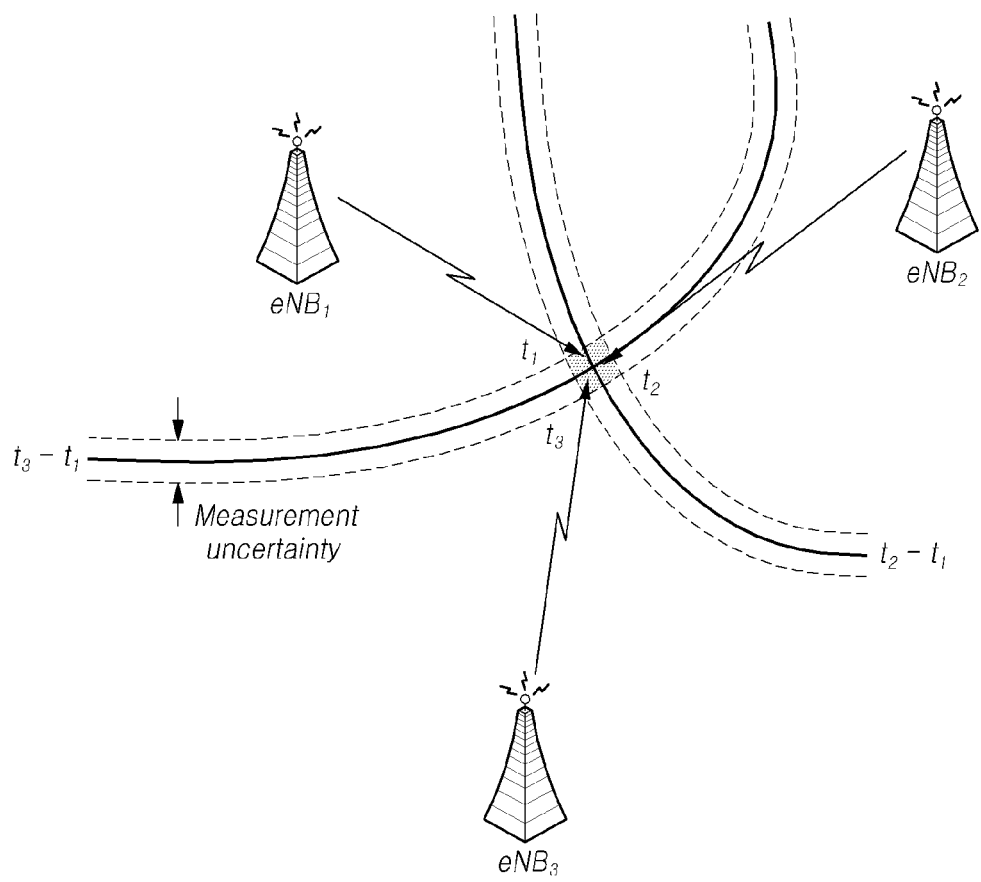
FIG. 13 is a view conceptually illustrating OTDOA-based positioning.

Observed Time Difference Of Arrival (OTDOA) is a representative technique of estimating a received signal time difference (RSTD), which is a difference in time between received signals as a basic principle for position measurement. Its basic principle is such that a position of a UE may be estimated by estimating an overlapping area based on time differences from at least 3 cells as shown in FIG. 13. For the PRS, PRS transmission information for a maximum of 24×3 (3-sectors) cells may be configured for a UE through higher-layer signaling.

Further, the UE is required to report RSTD values estimated for each cell to a corresponding base station. Following Table 7 represents values used for reporting time difference values estimated by the UE.

Basically, intervals from −15391 Ts to 15391 Ts are defined as a reporting range. Up to −4096 Ts RSTD≤4096≤Ts have 1 Ts resolution, and the remaining intervals have 5 Ts resolution.

TABLE 7

RSTD report mapping

| Reported Value | Measured Quantity Value | Unit |
|---|---|---|
| RSTD_0000 | −15391 > RSTD | $T_S$ |
| RSTD_0001 | −15391 ≤ RSTD < −15386 | $T_S$ |
| ... | ... | ... |
| RSTD_2258 | −4106 ≤ RSTD < −4101 | $T_S$ |
| RSTD_2259 | −4101 ≤ RSTD < −4096 | $T_S$ |
| RSTD_2260 | −4096 ≤ RSTD < −4095 | $T_S$ |
| RSTD_2261 | −4095 ≤ RSTD < −4094 | $T_S$ |
| ... | ... | ... |
| RSTD_6353 | −3 ≤ RSTD < −2 | $T_S$ |
| RSTD_6354 | −2 ≤ RSTD < −1 | $T_S$ |
| RSTD_6355 | −1 ≤ RSTD ≤ 0 | $T_S$ |
| RSTD_6356 | 0 < RSTD ≤ 1 | $T_S$ |
| RSTD_6357 | 1 < RSTD ≤ 2 | $T_S$ |
| RSTD_6358 | 2 < RSTD ≤ 3 | $T_S$ |
| ... | ... | ... |
| RSTD_10450 | 4094 < RSTD ≤ 4095 | $T_S$ |
| RSTD_10451 | 4095 < RSTD ≤ 4096 | $T_S$ |
| RSTD_10452 | 4096 < RSTD ≤ 4101 | $T_S$ |
| RSTD_10453 | 4101 < RSTD ≤ 4106 | $T_S$ |
| ... | ... | ... |
| RSTD_12709 | 15381 < RSTD ≤ 15386 | $T_S$ |
| RSTD_12710 | 15386 < RSTD ≤ 15391 | $T_S$ |
| RSTD_12711 | 15391 < RSTD | $T_S$ |

Additionally, reporting for high resolution is also included in the corresponding standard as in Table 7. These values may be transmitted along with previously estimated RSTD, and reporting using RSTD_delta_0, RSTD_delta_1 is available in −2260 Ts≤RSTD≤10451 Ts, while reporting using all values except for RSTD_delta_1 is available in the intervals of 0000 Ts≤RSTD≤2259 Ts and 10452 Ts≤RSTD≤12711 Ts. Here, 1 Ts is about 9.8m. The following is a method of calculating based on 15 Hz that is the subcarrier-spacing of the LTE.

SCS=15 kHz, a reference OFDM symbol length=66.7 us 2048 samples are generated on the time axis based on 2048 FFT (oversampling not applied)

a length per sample on the time axis (=1 Ts)=66.7 us/2048samples in time*(3*108 m/s)=9.8m

TABLE 8

Relative quantity mapping for higher-resolution RSTD measurement reporting

| Reported Retative Quantity Value | Measured Relative Quantity Value, $\Delta_{RSTD}$ | Unit |
|---|---|---|
| RSTD_delta_0 | 0 | $T_S$ |
| RSTD_delta_1 | 0.5 | $T_S$ |
| RSTD_delta_2 | 1.0 | $T_S$ |
| RSTD_delta_3 | 2.0 | $T_S$ |
| RSTD_delta_4 | 3.0 | $T_S$ |
| RSTD_delta_5 | 4.0 | $T_S$ |

There is no design introduced for a positioning reference signal (PRS) that may support a high resolution and various use cases being considered in NR positioning. The present disclosure introduces a positioning reference signal (PRS) configuration method for 5G NR. Hereinafter, methods for designing a positioning reference signal (PRS) capable of meeting high requirements and various use cases and signaling methods will be described in detail with reference to the relevant drawings.

Figure 14:
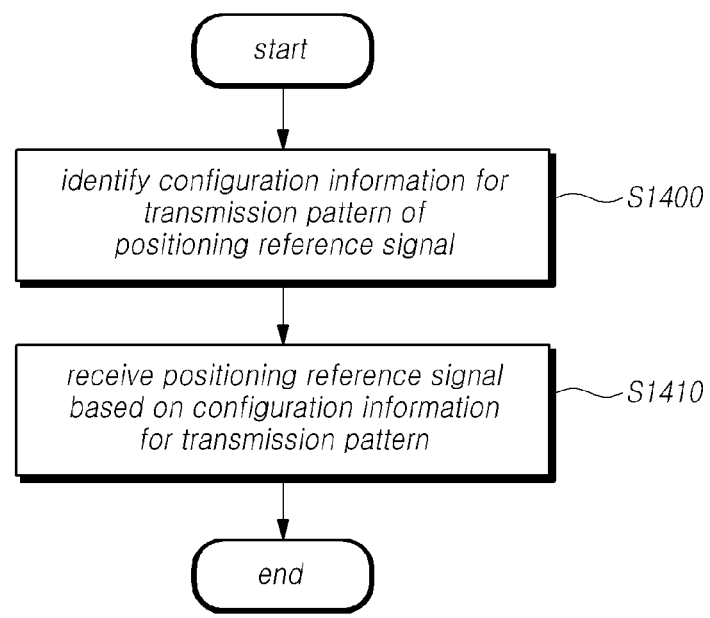
FIG. 14 is a view illustrating a procedure of a UE for performing positioning according to an embodiment.

FIG. 14 is a view illustrating a procedure of a UE for performing positioning according to an embodiment.

Referring to FIG. 14, a UE may identify configuration information about a transmission pattern of a positioning reference signal (S1400).

The transmission pattern of the positioning reference signal for UE positioning may be flexibly configured to meet various use scenarios of NR. That is, the positioning reference signal may be transmitted in various patterns on a radio resource according to use cases.

According to an embodiment, the transmission pattern of positioning reference signal may be altered via higher layer signaling from the base station depending on the UE's circumstances. That is, the base station may select a positioning reference signal transmission pattern suitable for the UE's circumstance, and the UE may receive configuration information about the selected transmission pattern via higher layer signaling.

For example, in the configuration information about the positioning reference signal transmission pattern, at least one of the transmission pattern index, frequency domain allocation information, or time domain allocation information for positioning reference signal transmission may be configured in a plurality of different patterns. To that end, a plurality of positioning reference signal transmission patterns individually corresponding to various use scenarios of NR may be previously determined, and a transmission pattern index for each transmission pattern may be determined. If a transmission pattern suitable for the UE's circumstance is selected, transmission pattern index for the selected transmission pattern may be included in the configuration information for the positioning reference signal transmission pattern.

Further, the configuration information for the positioning reference signal transmission pattern may include positioning reference signal density information in the frequency domain, which indicates the number of REs configured in one OFDM symbol per physical resource block (PRB). Further, the configuration information for the positioning reference signal transmission pattern may include density information about the positioning reference signal in the time domain, which indicates the number of OFDM symbols where the positioning reference signal is transmitted per slot.

Further, the configuration information for the positioning reference signal transmission pattern may include location information about the positioning reference signal in the time domain, which indicates the position of the OFDM symbol where the positioning reference signal is transmitted. Further, the configuration information for the positioning reference signal transmission pattern may include starting point information in the frequency domain, of the positioning reference signal RE, and starting point information in the time domain, of the OFDM symbol where the transmission of positioning reference signal starts.

That is, this enables configuration of various positioning reference signal patterns in the radio resource via higher layer signaling as compared with the prior art in which only a single pattern is applied to the positioning reference signal.

According to an embodiment, the configuration information for positioning reference signal transmission pattern may be configured based on configuration information of multiple channel state information reference signal (CSI-RS) resource. In this case, the transmission pattern of the positioning reference signal is transmitted to the UE via higher layer signaling, but the positioning reference signal may be transmitted using the CSI-RS resource. That is, a plurality of CSI-RSs may be configured for transmission of the positioning reference signal.

For example, various positioning reference signal transmission patterns may be configured by allocating a plurality of single symbol CSI-RS pattern-based CSI-RS resources. In this case, CSI-RS pattern configuration information may be directly configured for the CSI-RS resource via higher layer signaling. For example, the bitmap indicating the start position in the time domain and the position in the frequency domain, for the CSI-RS pattern, may be provided by the higher layer parameter.

Referring back to FIG. 14, the UE may receive the positioning reference signal based on the configuration information for transmission pattern (S1410).

The UE may receive the positioning reference signal in the radio resource allocated to transmission of the positioning reference signal based on the configuration information for the positioning reference signal transmission pattern. For example, for positioning the UE, the UE may receive a positioning reference signal from each of the serving cell and at least two or more neighboring cells. The UE may measure reference signal time difference information between the received reference signals.

The UE may transmit RSTD information for the positioning reference signals to the base station. The base station may estimate the crossing area based on the RSTD information. Thus, the UE's position may be estimated.

Meanwhile, to measure the vertical position of the UE, it is necessary to configure a positioning reference signal transmission pattern for vertical positioning along with the above-described UE horizontal positioning.

The positioning reference signal transmission pattern may be configured based on beamforming. A horizontal beam and a vertical beam each may be applied to beamforming-based positioning for the UE. The UE may report at least one of the horizontal beam information or vertical beam information configured in the reception of the positioning reference signal, along with the RSTD information, to the base station.

For example, the horizontal beam information may include the horizontal beam index, horizontal angle-of-arrival (AoA) information, and arrival time information. Further, the vertical beam information may include the vertical beam index, vertical AoA information, and arrival time information. The base station may determine the position of the UE based on the AoA information and arrival information for the corresponding beam. Hereinafter, embodiments for UE vertical positioning will be described in greater detail.

According to an embodiment, vertical beamforming may be applied to the transmission pattern of the positioning reference signal configured by the above-described higher layer signaling. That is, a different vertical beam may be applied to each symbol in the slot allocated for transmission of the positioning reference signal. To that end, the positioning reference signal configuration information by the higher layer signaling may further include information as to whether a vertical beam is configured.

The UE may report the beam index for the vertical beam applied to the reception of the positioning reference signal, along with the RSTD information, to the base station. For example, the UE may be configured to report the beam index for the vertical beam applied to the reception of the positioning reference signal among the beam indexes pre-configured for the vertical beam.

As another example, the UE may be configured to report the index of the symbol with the best reception quality of positioning reference signal. As described above, since different vertical beams are configured per symbol, the base station may identify the corresponding vertical beam based on the symbol index and may implicitly estimate the UE's vertical direction.

According to an embodiment, separately from the above-described horizontal positioning reference signal for horizontal positioning, a transmission interval of a vertical beamforming reference signal (beamformed PRS) may be configured based on beamforming for vertical positioning. For example, the vertical positioning reference signal transmission pattern may be configured for some symbols in the same slot. Or, as another example, the horizontal positioning reference signal and the vertical positioning reference signal may be configured for different slots.

Thus, the higher layer signaling indicating the configuration information for the positioning reference signal may include a higher layer parameter to provide the bitmap indicating the positions, in the slot, of the horizontal positioning reference signal and the vertical positioning reference signal.

According to an embodiment, the positioning reference signal may be transmitted based on the configuration information for the multiple CSI-RS resource for vertical positioning. In this case, the transmission pattern of the positioning reference signal is transmitted to the UE via higher layer signaling, but the positioning reference signal may be transmitted using the CSI-RS resource. That is, a plurality of CSI-RSs may be configured for transmitting the vertical positioning reference signal.

For example, various positioning reference signal transmission patterns may be configured by allocating a plurality of single symbol CSI-RS pattern-based CSI-RS resources. For example, a different vertical beam may be mapped to each of multiple CSI-RS resources. In this case, the UE may be configured to report the index (CSI-RS resource index (CRI)) for the CSI-RS resource with the best reception quality of vertical positioning reference signal.

Or, For example, a beamforming-based CSI-RS (beamformed CSI-RS) may be allocated to multiple ports. In this case, the UE may be configured to report the port index for the port allocated to the CSI-RS, along with the CRI.

Thus, a flexible transmission pattern of positioning reference signal may be configured to perform positioning in the next-generation wireless network, so that the positioning reference signal may be transmitted according to the transmission pattern suitable for various use scenarios.

Figure 15:
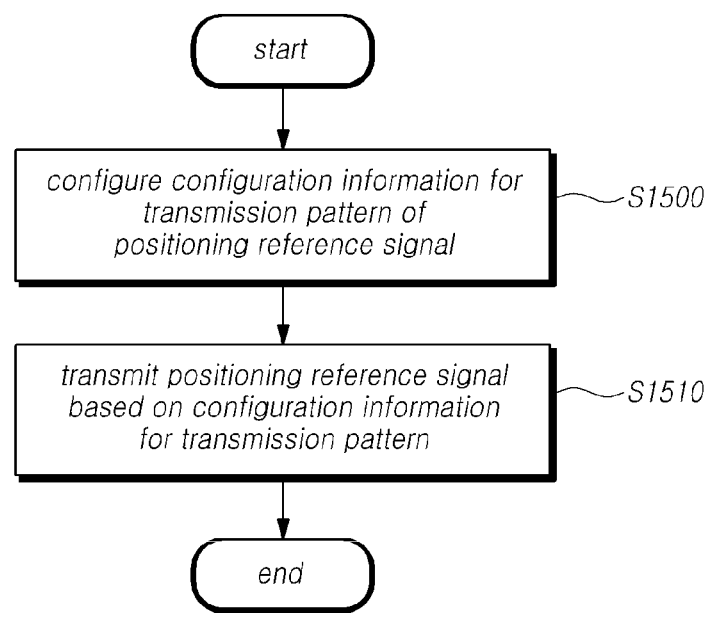
FIG. 15 is a view illustrating a procedure of a base station for performing positioning according to an embodiment.

FIG. 15 is a view illustrating a procedure of a base station for performing positioning according to an embodiment.

Referring to FIG. 15, the base station may configure configuration information for the transmission pattern of the positioning reference signal (S1500).

According to an embodiment, the transmission pattern of positioning reference signal may be altered via higher layer signaling from the base station depending on the UE's circumstances. That is, the base station may select a positioning reference signal transmission pattern suitable for the UE's circumstance and transmit configuration information about the selected transmission pattern to the UE via higher layer signaling.

For example, in the configuration information about the positioning reference signal transmission pattern, at least one of the transmission pattern index, frequency domain allocation information, and time domain allocation information for positioning reference signal transmission may be configured in a plurality of different patterns. To that end, a plurality of positioning reference signal transmission patterns individually corresponding to various use scenarios of NR may be previously configured, and a transmission pattern index for each transmission pattern may be configured. If a transmission pattern suitable for the UE's circumstance is selected, transmission pattern index for the selected transmission pattern may be included in the configuration information for the positioning reference signal transmission pattern.

Further, the configuration information for the positioning reference signal transmission pattern may include positioning reference signal density information in the frequency domain, which indicates the number of REs configured in one OFDM symbol per physical resource block (PRB). Further, the configuration information for the positioning reference signal transmission pattern may include density information about the positioning reference signal in the time domain, which indicates the number of OFDM symbols where the positioning reference signal is transmitted per slot.

Further, the configuration information for the positioning reference signal transmission pattern may include location information about the positioning reference signal in the time domain, which indicates the position of the OFDM symbol where the positioning reference signal is transmitted. Further, the configuration information for the positioning reference signal transmission pattern may include starting point information in the frequency domain, of the positioning reference signal RE, and starting point information in the time domain, of the OFDM symbol where the transmission of positioning reference signal starts.

That is, this enables configuration of various positioning reference signal patterns in the radio resource via higher layer signaling as compared with the prior art in which only a single pattern is applied to the positioning reference signal.

According to an embodiment, the base station may configure the configuration information for positioning reference signal transmission pattern based on configuration information of multiple channel state information reference signal (CSI-RS) resource. In this case, the base station may transmit the transmission pattern of the positioning reference signal to the UE via higher layer signaling, and the positioning reference signal may be transmitted using the CSI-RS resource. That is, a plurality of CSI-RSs may be configured for transmission of the positioning reference signal.

For example, the base station may configure various positioning reference signal transmission patterns by allocating a plurality of single symbol CSI-RS pattern-based CSI-RS resources. In this case, CSI-RS pattern configuration information may be directly configured for the CSI-RS resource via higher layer signaling. For example, the bitmap indicating the start position in the time domain and the position in the frequency domain, for the CSI-RS pattern, may be provided by the higher layer parameter.

Referring back to FIG. 15, the base station may transmit the positioning reference signal based on the configuration information for transmission pattern (S1510).

The UE may receive the positioning reference signal in the radio resource allocated to transmission of the positioning reference signal based on the configuration information for the positioning reference signal transmission pattern. For example, for positioning the UE, the UE may receive a positioning reference signal from each of the serving cell and at least two or more neighboring cells. The UE may measure reference signal time difference information between the received reference signals.

The base station may receive the RSTD information for the positioning reference signal from the UE. The base station may estimate the crossing area based on the RSTD information. Thus, the UE's position may be estimated.

Meanwhile, to measure the vertical position of the UE, it is necessary to configure a positioning reference signal transmission pattern for vertical positioning along with the above-described UE horizontal positioning.

The base station may configure the positioning reference signal transmission pattern based on beamforming. A horizontal beam and a vertical beam each may be applied to beamforming-based positioning for the UE. The base station may receive at least one of the horizontal beam information and vertical beam information configured in the reception of the positioning reference signal, along with the RSTD information, from the UE.

For example, the horizontal beam information may include the horizontal beam index, horizontal angle-of-arrival (AoA) information, and arrival time information. Further, the vertical beam information may include the vertical beam index, vertical AoA information, and arrival time information. The base station may determine the position of the UE based on the AoA information and arrival information for the corresponding beam. Hereinafter, embodiments for UE vertical positioning will be described in greater detail.

According to an embodiment, vertical beamforming may be applied to the transmission pattern of the positioning reference signal configured by the above-described higher layer signaling. That is, the base station may apply a different vertical beam to each symbol in the slot allocated for transmission of the positioning reference signal. To that end, the positioning reference signal configuration information by the higher layer signaling may further include information as to whether a vertical beam is configured.

The base station may receive the beam index for the vertical beam applied to the reception of the positioning reference signal, along with the RSTD information, from the UE. For example, the UE may be configured to report the beam index for the vertical beam applied to the reception of the positioning reference signal among the beam indexes pre-configured for the vertical beam.

As another example, the UE may be configured to report the index of the symbol with the best reception quality of positioning reference signal. As described above, since different vertical beams are configured per symbol, the base station may identify the corresponding vertical beam based on the symbol index and may implicitly estimate the UE's vertical direction.

According to an embodiment, separately from the above-described horizontal positioning reference signal for horizontal positioning, a transmission interval of a vertical beamforming reference signal (beamformed PRS) based on beamforming for vertical positioning may be configured. For example, the vertical positioning reference signal transmission pattern may be configured for some symbols in the same slot. Or, as another example, the horizontal positioning reference signal and the vertical positioning reference signal may be configured for different slots.

Thus, the higher layer signaling indicating the configuration information for the positioning reference signal may include a higher layer parameter to provide the bitmap indicating the positions, in the slot, of the horizontal positioning reference signal and the vertical positioning reference signal.

According to an embodiment, the positioning reference signal may be transmitted based on the configuration information for the multiple CSI-RS resource for vertical positioning. In this case, the base station may transmit the transmission pattern of the positioning reference signal to the UE via higher layer signaling, and the positioning reference signal may be transmitted using the CSI-RS resource. That is, a plurality of CSI-RSs may be configured for transmission of the vertical positioning reference signal.

For example, various positioning reference signal transmission patterns may be configured by allocating a plurality of single symbol CSI-RS pattern-based CSI-RS resources. For example, a different vertical beam may be mapped to each of multiple CSI-RS resources. In this case, the UE may be configured to report the index (CSI-RS resource index (CRI)) for the CSI-RS resource with the best reception quality of vertical positioning reference signal.

Or, For example, a beamforming-based CSI-RS (beamformed CSI-RS) may be allocated to multiple ports. In this case, the UE may be configured to report the port index for the port allocated to the CSI-RS, along with the CRI.

The base station may estimate the UE's vertical position based on the port index or the index for the CSI-RS resource received from the UE.

Thus, a flexible transmission pattern of positioning reference signal may be configured to perform positioning in the next-generation wireless network, so that the positioning reference signal may be transmitted according to the transmission pattern suitable for various use scenarios.

Hereinafter each embodiment for configuring a transmission pattern of a positioning reference signal will be described in detail with reference to the accompanying drawings.

A use case that is mainly introduced in association with the NR positioning basically refers to positioning use case and accuracy in TR 22.862. This is summarized in Table 9 below.

TABLE 9

| SMARTER Use Cases and Potential Positioning Requirements | |
|---|---|
| Use case | Accuracy |
| Higher accuracy positioning outdoor with high speed moving | <1 m Up to 200 km/h |
| Higher accuracy positioning with low speed moving (including indoor and outdoor) | <1 m Indoor and Outdoor |

TABLE 9-continued

| SMARTER Use Cases and Potential Positioning Requirements | |
|---|---|
| Use case | Accuracy |
| Higher accuracy positioning for low altitude UAV in critical condition (e.g. Drones) | Remote control (Outdoor): 0.5 m Horizontal 0.3 m Vertical Data analysis (Outdoor): 0.1 m Horizontal 0.1 m Vertical |
| Higher accuracy positioning for mIoT | Wearables (Outdoor/Indoor): 2 m Horizontal Patient location (in Hospital): 3 m Horizontal Patient location (out Hospital): 200 m Horizontal |

Summarizing NR requirements, higher resolution than that of LTE should be provided and also various use cases should be supported. Thus, a specific embodiment for signaling and designing a flexible pattern-based positioning reference signal (PRS) capable of supporting various use cases of NR is described below.

In a first embodiment, a positioning reference signal (PRS) for supporting a flexible pattern to support various use cases may be introduced.

Since accuracy and UE processing time may be defined differently per each use case in 5G NR positioning, a fixed positioning reference signal pattern may have restrictions on supporting. Thus, proposed is a flexible structure capable of varying the positioning reference signal pattern configuration according to circumstances.

To that end, according to an embodiment, the base station may configure the positioning reference signal pattern suitable for the UE use case via higher layer signaling. This may mean that various positioning reference signal patterns are directly selected by the network and indicated to the UE. In legacy LTE, PRS_Info provides information related to the positioning reference signal configuration to the UE in one cell as shown in FIG. 16.

The positioning reference signal configuration-related information is provided to the UE. Such positioning reference signal configuration-related information provides information, for example, positioning reference signal transmission bandwidth, positioning reference signal (PRS) configuration index, number of consecutive positioning reference signal subframes, and positioning reference signal (PRS) muting pattern. The positioning reference signal configuration index provides the positioning reference signal transmission period and shielding film offset information as shown in Table 10 below.

TABLE 10

| Positioning reference signal subframe configuration | | |
|---|---|---|
| PRS configuration index $I_{PRS}$ | PRS periodicity $T_{PRS}$ (subframes) | PRS subframe offset $\Delta_{PRS}$ (subframes) |
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

As describe, the legacy positioning reference signal higher-layer configuration information lacks positioning reference signal pattern configuration information. This is why only a single pattern predetermined in all the cells is used as the default positioning reference signal pattern. Thus, it is necessary to newly add positioning reference signal pattern information which is dependent upon various use cases in NR. For example, the positioning reference signal pattern information may directly and newly include or include, in the form of a positioning reference signal (PRS) pattern configuration index, the following information.

Positioning reference signal (PRS) pattern index: may indicate information to define the positioning reference signal pattern's own pattern. For example, the increasing pattern/fixed pattern of subcarrier index of the positioning reference signal RE may be defined depending on the OFDM symbol. However, without limitations thereto, various irregular patterns may be defined.

Positioning reference signal (PRS) density in frequency domain: typically, the positioning reference signal density ($\rho$) is set to 2 REs/symbol/PRB. That is, as shown in FIG. 12, a fixed structure is configured in which two positioning reference signal REs are necessarily transmitted in one OFDM symbol. In contrast, according to the disclosure, the positioning reference signal density may be defined not only as $\rho=2$ but may also be defined to various values, such as 1/2/3/4/ . . . /12. However, this is merely an example, and all of the positioning reference signal density values proposed may be used or only some thereof may be selectively used.

Positioning reference signal (PRS) location in time domain: in the LTE positioning reference signal, the OFDM symbol location where the positioning reference signal is transmitted considering the CRS transmission port is fixed. For example, as shown in FIG. 12, in the LTE normal CP case, symbols (3, 5, 6) in the first slot and symbols (1, 2, 3, 5, 6) or (2, 3, 4, 5, 6) in the second slot are set. However, according to the disclosure, the transmission location of positioning reference signal may be freely determined by the base station. For example, in the NR 14-symbol slot, up to 14 OFDM symbols may be selected to transmit the positioning reference signal. Thus, the corresponding field may be defined with, e.g., PRS location in time domain or PRS_mapping_time information and may be expressed as 14-bit information, such as $[l_0, l_1, l_3, \ldots l_{13}]$. For example, if this information is set to [00111111111111], the positioning reference signal may be transmitted in the OFDM symbols in the entire NR slot except for the first two OFDM symbols. The information means being newly transmitted in N bits, and the above-described definition of 14 bits is an example.

Positioning reference signal (PRS) starting point in frequency domain: it may mean the starting position of the positioning reference signal RE in the disclosure. In the LTE positioning reference signal, the starting point in frequency domain of the positioning reference signal RE is implicitly determined by the physical cell ID (PCID). Thus, if its own serving cell PCID is obtained, the positioning reference signal pattern is automatically recognized by the UE. However, in the NR positioning reference signal, such starting point in frequency domain or frequency domain offset may be directly indicated to support a more flexible positioning reference signal structure. The value of the information may have an NR PCID or may be determined within a specific range. For example, in NR, the PCID has a range of 0, 1, 2, . . . , and 1007 (1008 count). Thus, a PCID within the range may be arbitrarily designated and be transmitted to the UE, or a range may be determined considering the maximum neighboring cell list range. For example, in LTE, for up to 24 cells, a neighboring cell list is transferred to the UE via positioning reference signal configuration information. Or, the positioning reference signal starting point may be determined based on the frequency reuse factor. For example, if the number of positioning reference signal REs per OFDM symbol is two, the frequency reuse factor becomes 6. That is, since there are up to six orthogonal allocation patterns, the frequency domain offset information may be transferred via less, 6-bit information.

Positioning reference signal (PRS) starting point in time domain: it may denote the information indicating the starting OFDM symbol position where the positioning reference signal is transmitted. When the above-described information of positioning reference signal (PRS) location in time domain is absent, the information of starting position in time domain may be further needed. The range of the information may be determined from among (0,1, to 13) based on the 14 OFDM slot.

A specific example of defining a positioning reference signal (PRS) configuration pattern using the above-described NR positioning reference signal configuration information has been described above in connection with FIGS. 17 to 20.

Figure 17:
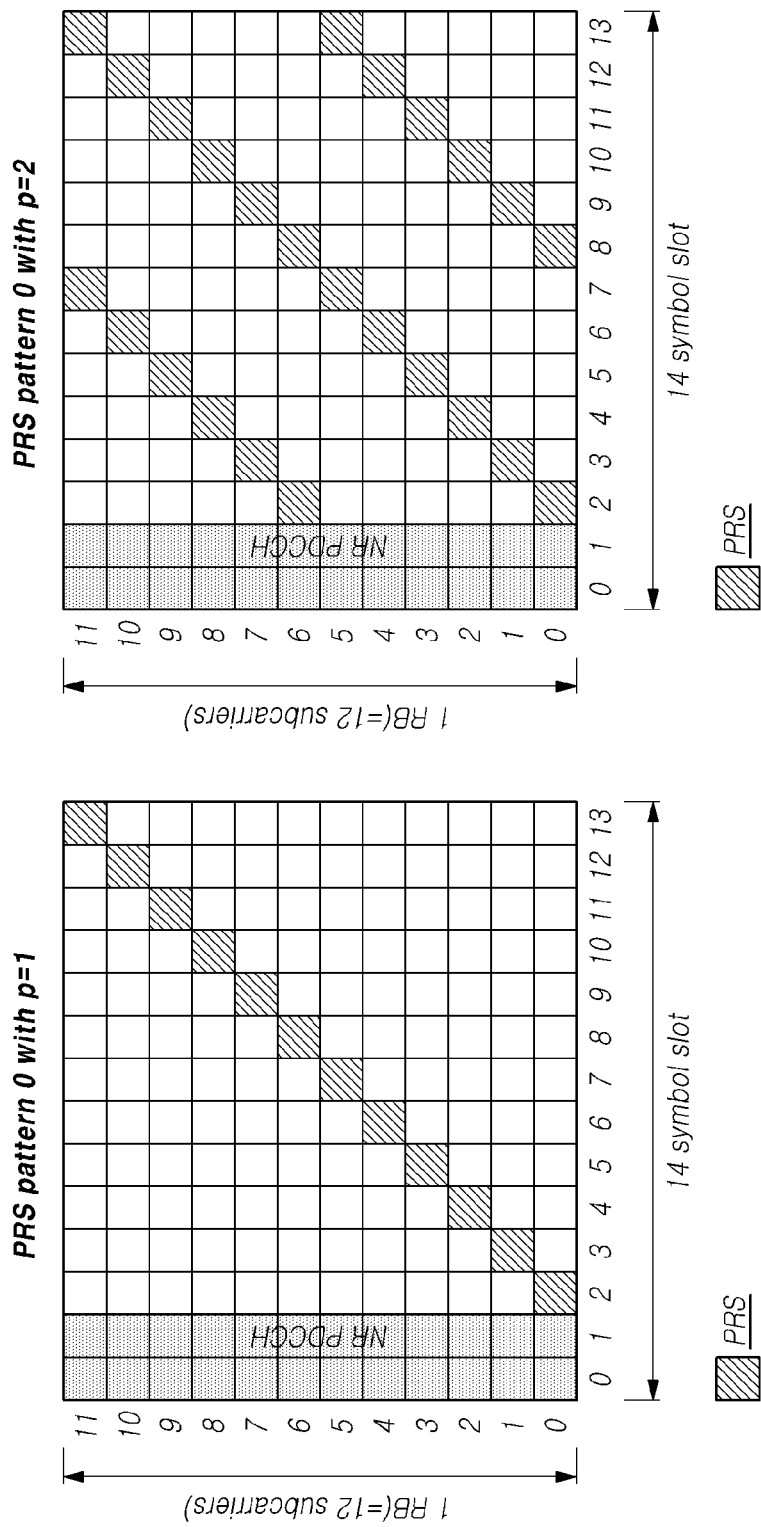
FIG. 17 is a view illustrating an example (ramping pattern, ρ=1,2) of a pattern configuration of an NR positioning reference signal according to an embodiment.
Figure 18:
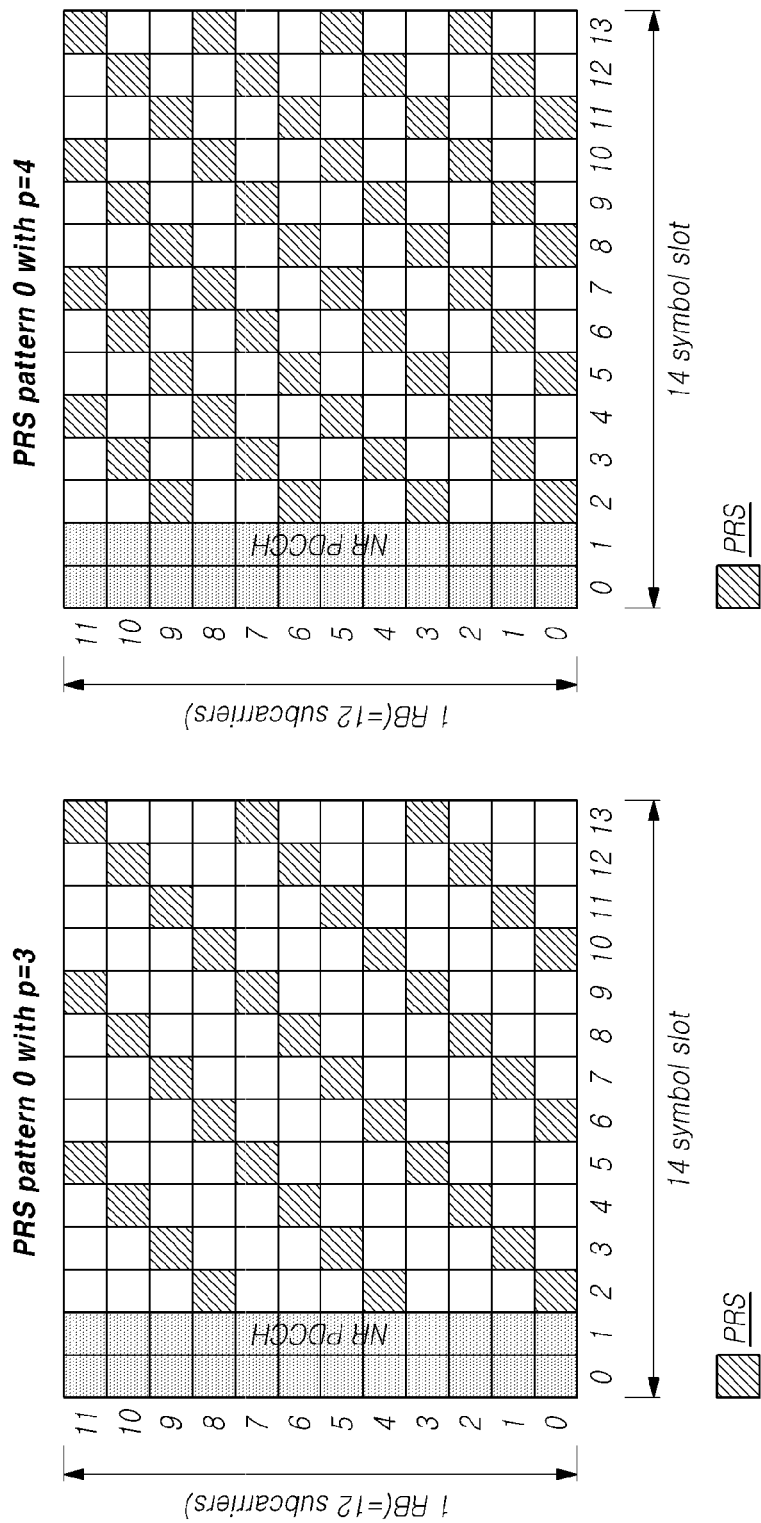
FIG. 18 is a view illustrating an example (ramping pattern, ρ=3,4) of a pattern configuration of an NR positioning reference signal according to an embodiment.

As shown in FIGS. 17 and 18, PRS pattern=0 may be set in the pattern of ramping (SC index increase) as the same OFDM symbol index as LTE increases. FIG. 17 illustrates the RPS configuration pattern where the positioning reference signal density ($\rho$) is 1 or 2 REs/symbol/PRS, and FIG. 18 illustrates the PRS configuration pattern where the positioning reference signal density ($\rho$) is 3 or 4 REs/symbol/PRS.

Figure 19:
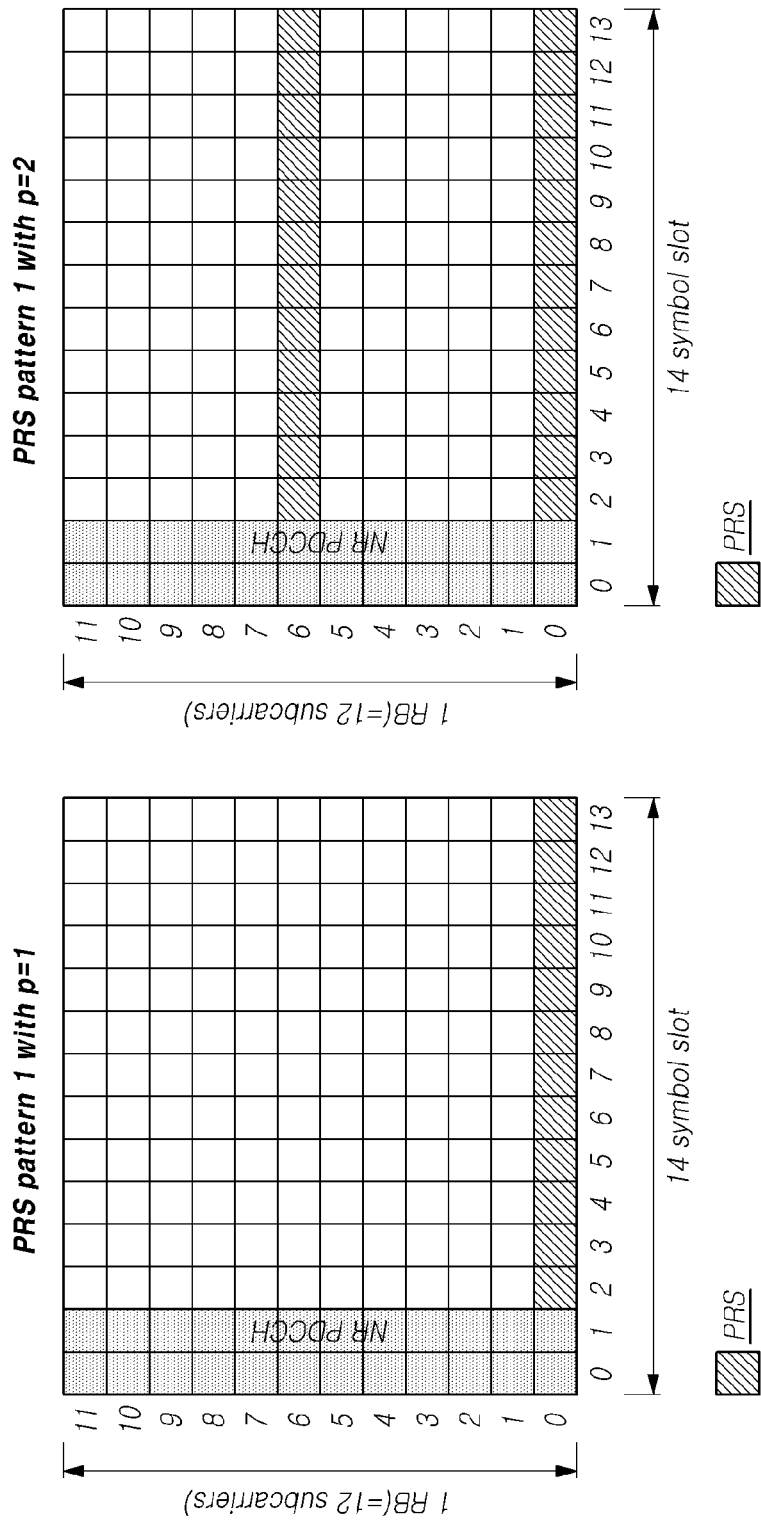
FIG. 19 is a view illustrating an example (fixed pattern, ρ=1,2) of a pattern configuration of an NR positioning reference signal according to an embodiment.
Figure 20:
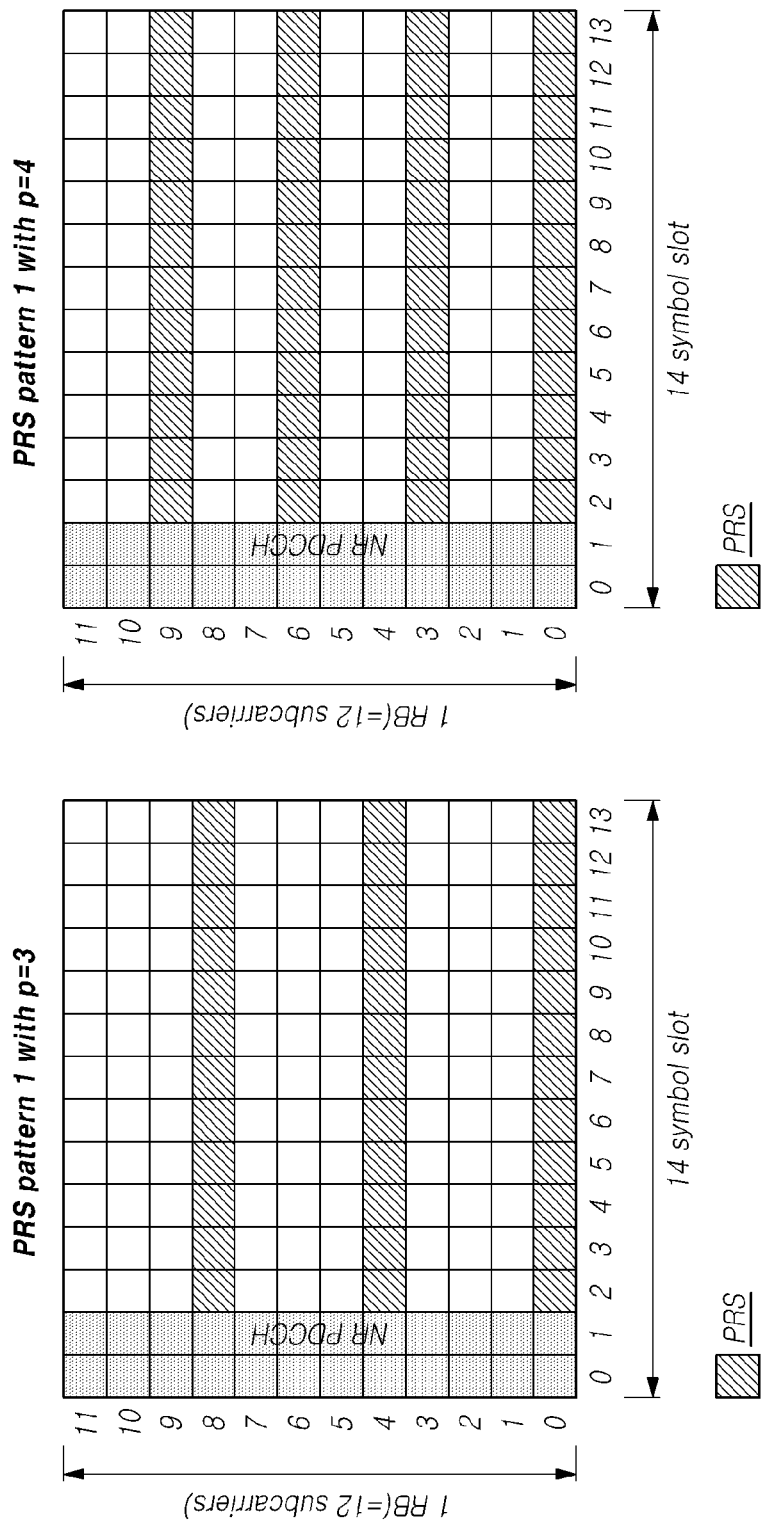
FIG. 20 is a view illustrating an example (fixed pattern, ρ=3,4) of a pattern configuration of an NR positioning reference signal according to an embodiment.

As shown in FIGS. 19 and 20, PRS pattern=1 may be set in a pattern fixed regardless of the OFDM symbol index. FIG. 19 illustrates the PRS configuration pattern where the positioning reference signal density ($\rho$) is 1 or 2 REs/symbol/PRS, and FIG. 20 illustrates the PRS configuration pattern where the positioning reference signal density ($\rho$) is 3 or 4 REs/symbol/PRS.

In a second embodiment, a multiple CSI-RS resource configuration may be used for a flexible positioning reference signal pattern configuration. That is, to define an NR positioning reference signal, a method of using the NR CSI-RS resource is proposed.

In this case, in the positioning reference signal pattern configuration, the corresponding is transmitted to the UE via higher layer signaling, but the actual positioning reference signal may be transmitted using the CSI-RS resource. Basically, the NR CSI-RS defines 1-symbol CSI-RS pattern as shown in Table 11 and provides a category in which the CSI-RS RE density ($\rho$) may have a value of one or more.

TABLE 11

| CSI-RS locations within a slot | | | | | | |
|---|---|---|---|---|---|---|
| Row | Ports | Density $\rho$ | CDMtype | $(\bar{k}, \bar{l})$ | k' | l' |
| 1 | 1 | 3 | No CDM | $(k_0, l_0), (k_0 + 4, l_0), (k_0 + 8, l_0)$ | 0 | 0 |
| 2 | 1 | 1, 0.5 | No CDM | $(k_0, l_0)$ | 0 | 0 |

For example, multiple NR CSI-RS resources may be configured for the purpose of transmitting a positioning reference signal. Unlike LTE, NR has no cell-specific reference signal RS. That is, all RSs have the nature of being UE-specific. Since among such RSs, the CSI-RS has the characteristic of flexible configuration, changes may be made to the corresponding CSI-RS location table as shown in Table 12 to provide various densities of positioning reference signal. In Table 12, the CSI-RS pattern where the CSI-RS RE density ($\rho$) in X rows is 2, 4, 6, or 12 may be added as a new CSI-RS pattern. Such new CSI-RS pattern may add other category or be included in part of the table proposed, as necessary.

That is, according to the disclosure, an intended positioning reference signal pattern may be defined by allocating multiple (N) single symbol CSI-RS pattern-based CSI-RS resources.

TABLE 12

| | | | CSI-RS locations within a slot | | | |
|---|---|---|---|---|---|---|
| Row | Ports | Density $\rho$ | CDMtype | $(\bar{k},\bar{l})$ | k' | l' |
| 1 | 1 | 3 | No CDM | $(k_0, l_0), (k_0 + 4, l_0), (k_0 + 8, l_0)$ | 0 | 0 |
| 2 | 1 | 1, 0.5 | No CDM | $(k_0, l_0)$ | 0 | 0 |
| X | 1 | 2 | No CDM | $(k_0, l_0), (k_0 + 6, l_0)$ | 0 | 0 |
| X | 1 | 4 | No CDM | $(k_0, l_0), (k_0 + 3, l_0), (k_0 + 6, l_0) (k_0 + 9, l_0)$ | 0 | 0 |
| X | 1 | 6 | No CDM | $(k_0, l_0), (k_0 + 2, l_0), (k_0 + 4, l_0),$ $(k_0 + 6, l_0), (k_0 + 8, l_0), (k_0 + 10, l_0)$ | 0 | 0 |
| X | 1 | 12 | No CDM | $(k_0, l_0), (k_0 + 1, l_0), (k_0 + 2, l_0) (k_0 + 11, l_0)$ | 0 | 0 |

Described below is a specific embodiment of defining a positioning reference signal pattern using the above-defined single symbol CSI-RS pattern information.

For example, CSI-RS pattern configuration information may be directly configured for the CSI-RS resource. That is, a mapping position may be set in each of the frequency domain and the time domain. Position allocation information may be provided in the higher-layer parameter CSI-RS-ResourceMapping of RRC signaling for the actual NR CSI-RS configuration. A specific range may be set as follows within an in-slot symbol interval (0~13 symbol index), frequency interval (0~11 Subcarrier index) range.

Time domain indication: The time-domain locations $l_0$ and $l_1$ are defined relative to the start of a slot with the starting positions of a CSI-RS in a slot $\bar{l} \in \{0, 1, \ldots, 13\}$ configured by the higher-layer parameter CSI-RS-ResourceMapping.

Frequency domain indication: The frequency-domain location is given by a bitmap provided by the higher-layer parameter CSI-RS-ResourceMapping where $k_i$ in Table 7.4.1.5.2-1(Table 11, refer to TS38.211) corresponds to the $i^{th}$ set bit in the bitmap, starting from $b_0$, with the bitmap and value of $k_i$ given by $[b_{11} \ldots b_0]$, $k_i=f(i)$ for row 2 of Table 7.4.1.5.2-1=>$\rho$=1 (12 bit)

$[b_3 \ldots b_0]$, $k_i=f(i)$ for row 1 of Table 7.4.1.5.2-1=>$\rho$=3(4 bit)

$[b_5 \ldots b_0]$, $k_i=f(i)$ for row X of Table 7.4.1.5.2-1=>$\rho$=2(6 bit)

$[b_2 \ldots b_0]$, $k_i=f(i)$ for row X of Table 7.4.1.5.2-1=>$\rho$=4 (3 bit)

Figure 21:
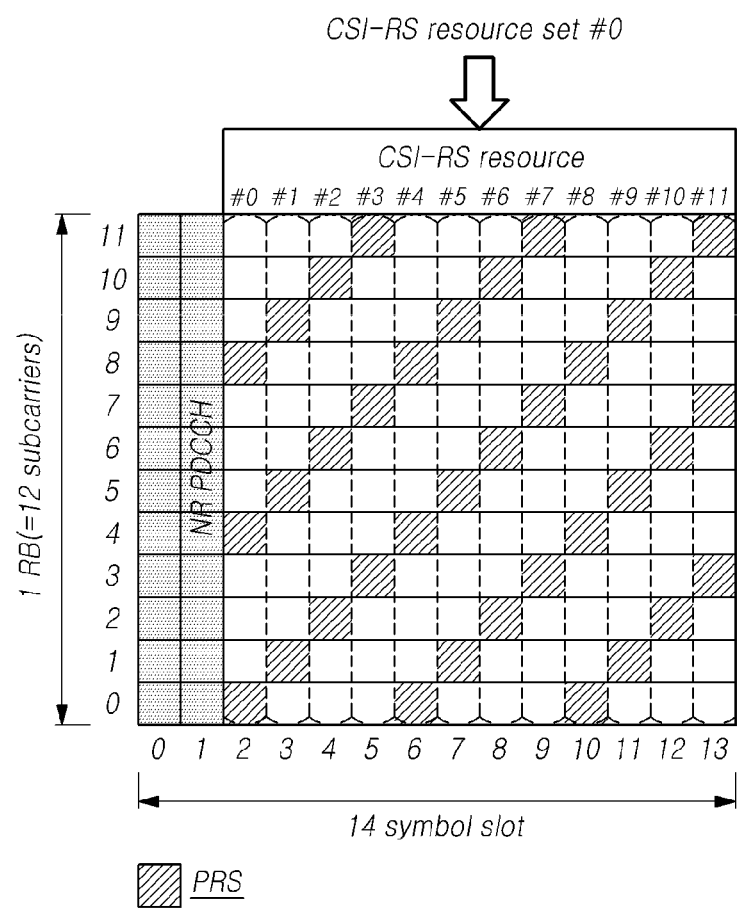
FIG. 21 is a view illustrating an example of a pattern configuration of a positioning reference signal using a multiple channel state information reference signal (CSI-RS) resource configuration according to an embodiment.

In the frequency domain indication, the following two parts ($[b_5 \ldots b_0], [b_2 \ldots b_0]$) mean an example newly added based on the CSI-RS location. The positioning reference signal may include N CSI-RS resources having such a flexible CSI-RS allocation characteristic, defining the intended positioning reference signal pattern. For example, to implement the positioning reference signal pattern (fixed pattern, $\rho$=3) of FIG. 21, $N_k$=12 CSI-RS resources in total may be defined. In this case, each position may be configured using the higher layer parameter CSI-RS-ResourceMapping transferring frequency-time location information per CSI-RS resource.

In an embodiment for such purpose, upon configuring a positioning reference signal in slot, the starting positions of N single symbol CSI-RS resources may be set to be the same.

Figure 22:
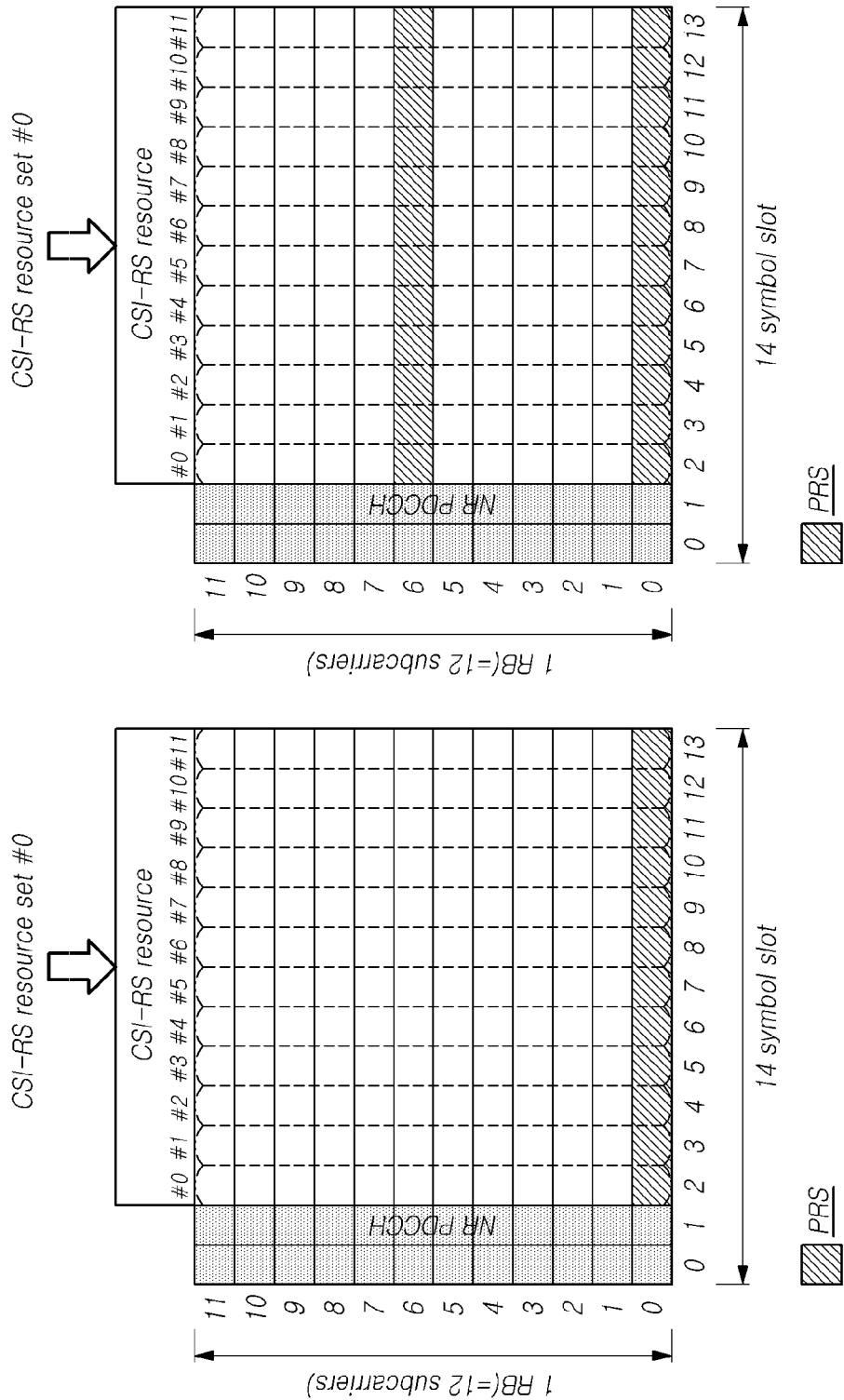
FIG. 22 is a view illustrating an example (fixed pattern) of a positioning reference signal configuration using a multiple channel state information reference signal (CSI-RS) resource according to an embodiment.
Figure 23:
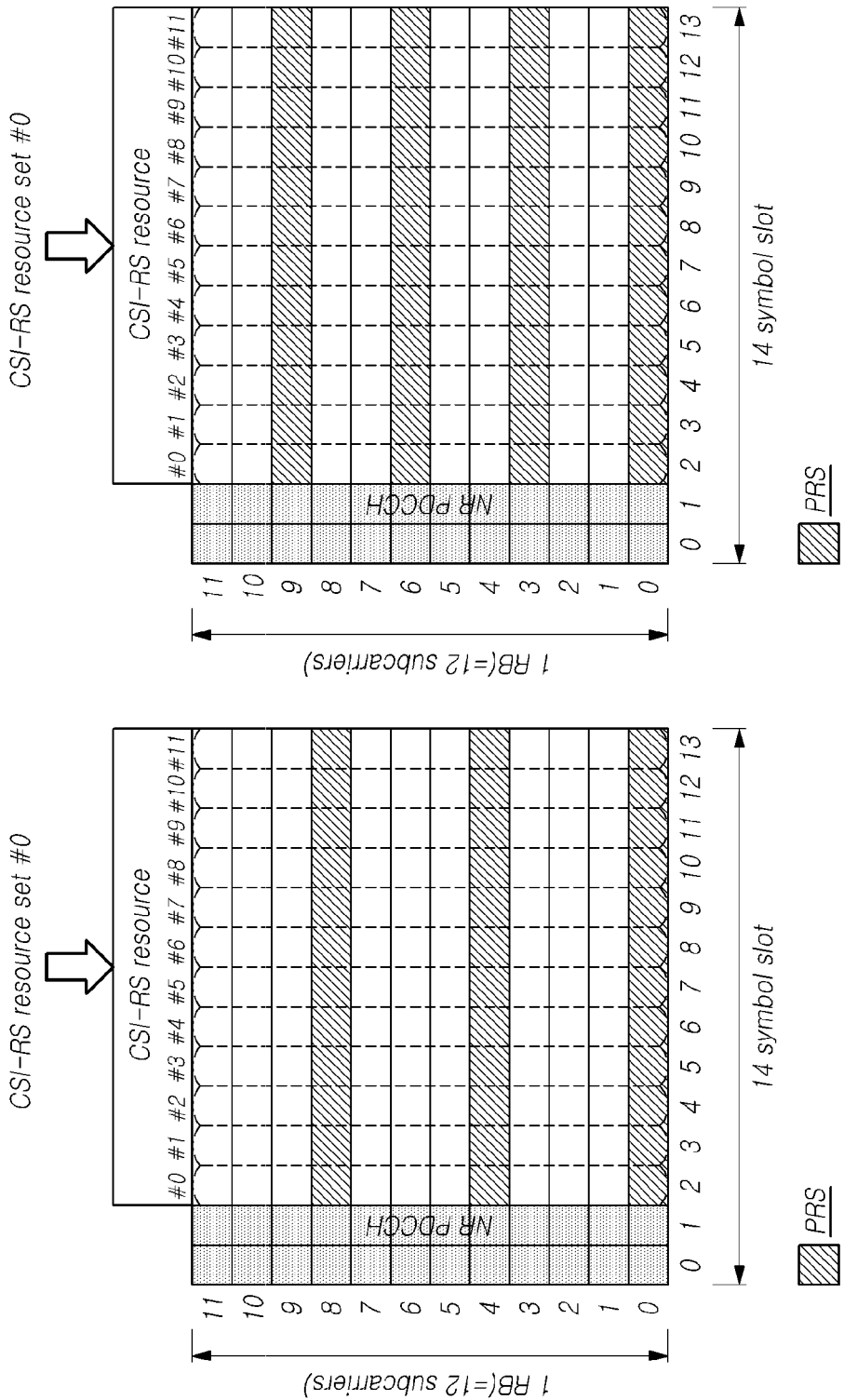
FIG. 23 is a view illustrating an example (fixed pattern) of a positioning reference signal configuration using a multiple channel state information reference signal (CSI-RS) resource according to an embodiment.

In this case, it is assumed that one CSI-RS resource set is defined in the NR slot, with a total 12 CSI-RS resources configured therein. In the following, in the cases where $\rho$=1, 2, 3, and 4 for the allocation position of CSI-RS RE in slot, the positioning reference signal (PRS) pattern may be configured based on the function-domain higher layer parameter CSI-RS-ResourceMapping configuration information. According to this, the same RE mapping applies for all the CSI-RS resources in the slot as shown in FIGS. 22 and 23. In this case, FIG. 22 illustrates the positioning reference signal (PRS) patterns (Case 1 and Case 2) where $\rho$=1 and 2, and FIG. 23 illustrates the positioning reference signal patterns (Case 3 and Case 4) where $\rho$=3 and 4.

1. Case 1: $\rho$=1 (12 bit)=>$[b_{11} \ldots b_0]$, $k_i=f(i)$ (refer to row 2, Table 12)

Starting SC location of CSI-RS resource #0, #1, . . . , #11=[000000000001]=>$b_0$ 2. Case 2: $\rho$=2 (6 bit)=>$[b_5 \ldots b_0]$, $k_i=f(i)$ (refer to row x, Table 12)

Starting SC location of CSI-RS resource #0, #1, . . . , #11=[000001000001]=>(b6, b0)

3. Case 3: $\rho$=3 (4 bit)=>$[b_3 \ldots b_0]$, $k_i=f(i)$ (refer to row 1, Table 12)

Starting SC location of CSI-RS resource #0, #1, . . . , #11=[00010001]=>(b8, b4, b0)

4. Case 4: $\rho$=4 (3 bit)=>$[b_2 \ldots b_0]$, $k_i=f(i)$ (refer to row x, Table 12)

Starting SC location of CSI-RS resource #0, #1, . . . , #11=[001001001]=>(b9, b6, b3, b0)

In another embodiment, upon configuring the positioning reference signal in slot, the starting positions of N single symbol CSI-RS resources may be same in part or be set to differ from each other.

Figure 24:
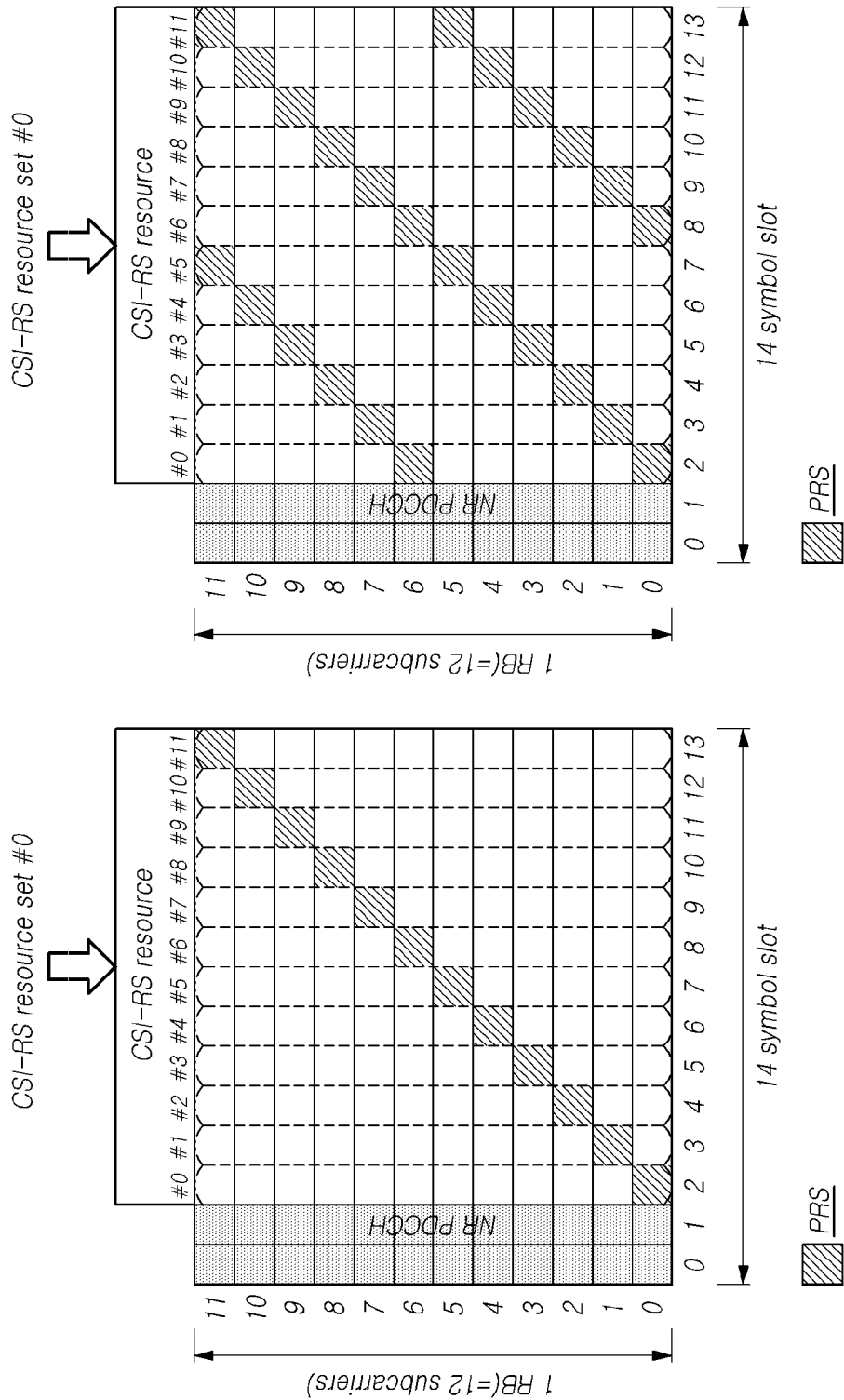
FIG. 24 is a view illustrating an example (ramping/increase pattern) of a positioning reference signal configuration using a multiple channel state information reference signal (CSI-RS) resource according to an embodiment.
Figure 25:
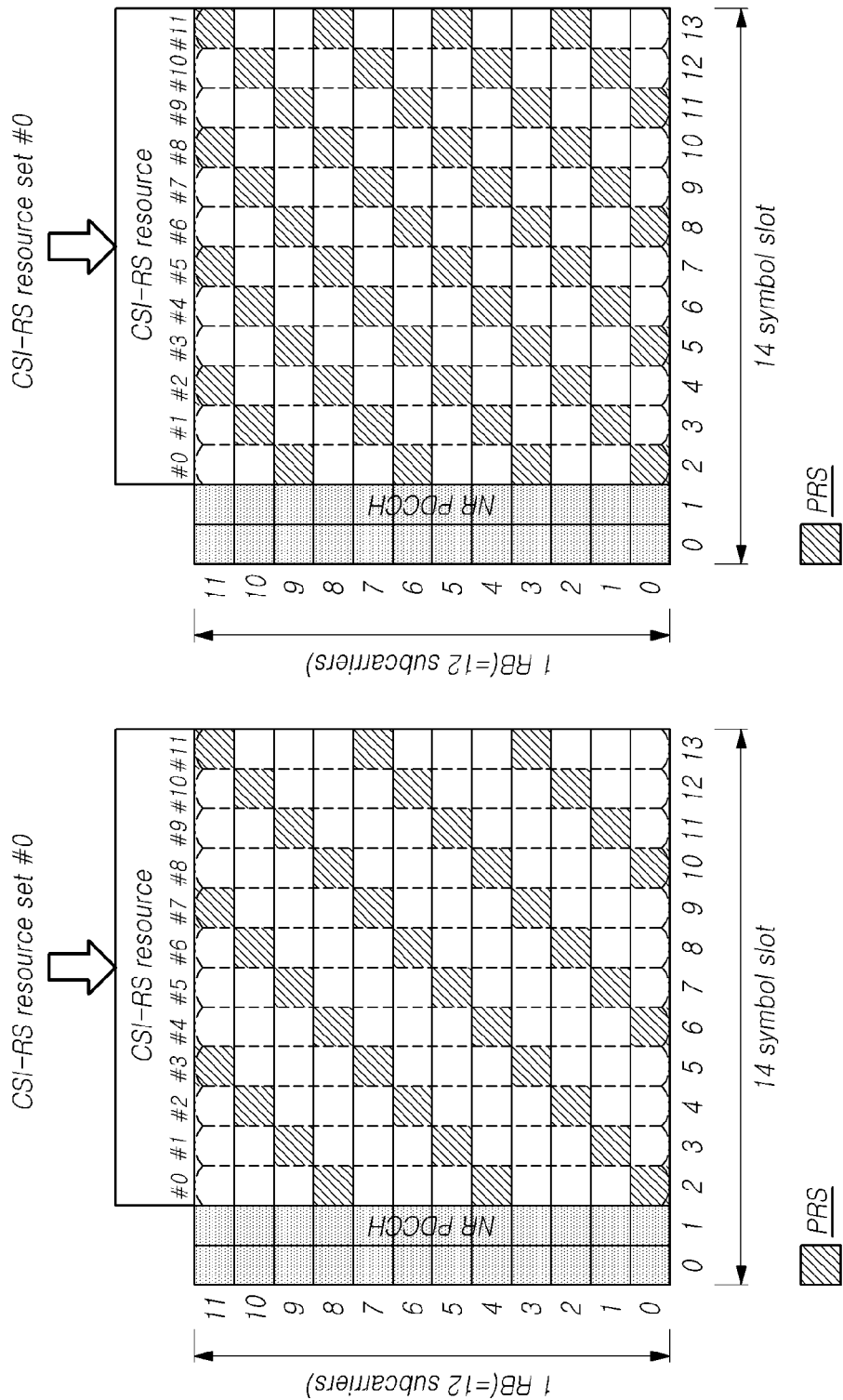
FIG. 25 is a view illustrating an example (ramping/increase pattern) of a positioning reference signal configuration using a multiple channel state information reference signal (CSI-RS) resource according to an embodiment.

In this case, it is assumed that one CSI-RS resource set is defined in the NR slot, with a total 12 CSI-RS resources configured therein. In the following, in the cases where $\rho$=1, 2, 3, and 4 for the allocation position of CSI-RS RE in slot, the positioning reference signal (PRS) pattern may be configured based on the function-domain higher layer parameter CSI-RS-ResourceMapping configuration information. According to this, all the CSI-RS resources in the slot may be rendered to differ (ramping case) as shown in FIGS. 24 and 25. In this case, FIG. 24 illustrates the PRS patterns (Case 1 and Case 2) where $\rho$=1 and 2, and FIG. 25 illustrates the PRS patterns (Case 3 and Case 4) where $\rho$=3 and 4.

Case 1: ρ=1 (12 bit)=>[$b_{11}$ ... $b_0$], $k_i$=f(i) (refer to row 2, Table 12)
Starting SC location of CSI-RS resource #0= [000000000001]=>b0
Starting SC location of CSI-RS resource #1= [000000000010]=>b1
Starting SC location of CSI-RS resource #2= [000000000100]=>b2
Starting SC location of CSI-RS resource #11= [100000000000]=>b11
. . .
2. Case 2: ρ=2 (6 bit)=>[$b_5$ ... $b_0$], $k_i$=f(i) (refer to row x, Table 12)
Starting SC location of CSI-RS resource #0= [000000000001]=>(b6,b0)
Starting SC location of CSI-RS resource #1= [000000000010]=>(b7,b1)
Starting SC location of CSI-RS resource #2= [000000000100]=>(b8,b2)
Starting SC location of CSI-RS resource #3= [001000001000]=>(b9,b3)
Starting SC location of CSI-RS resource #4= [010000010000]=>(b10,b4)
Starting SC location of CSI-RS resource #5= [100000100000]=>(b11,b5)
Starting SC location of CSI-RS resource #6= [000001000001]=>(b6,b0)
. . .
Starting SC location of CSI-RS resource #11= [100000100000]=>(b6, b0)
3. Case 3: ρ=3 (4 bit)=>[$b_3$ ... $b_0$], $k_i$=f(i) (refer to row 1, Table 12)
Starting SC location of CSI-RS resource #0= [000100010001]=>(b8,b4,b0)
Starting SC location of CSI-RS resource #1= [001000100010]=>(b9,b5,b1)
Starting SC location of CSI-RS resource #2= [010001000100]=>(b10,b6,b2)
Starting SC location of CSI-RS resource #3= [100010001000]=>(b11,b7,b3)
Starting SC location of CSI-RS resource #4= [000100010001]=>(b8,b4,b0)
. . .
Starting SC location of CSI-RS resource #11= [100010001000]=>(b11,b7,b3)
4. Case 4: ρ=4 (3 bit)=>[$b_2$ ... $b_0$], $k_i$=f(i) (refer to row x, Table 12)
Starting SC location of CSI-RS resource #0= [001001001001]=>(b9,b6,b3,b0)
Starting SC location of CSI-RS resource #1= [010010010010]=>(b10,b7,b4,b1)
Starting SC location of CSI-RS resource #2= [100100100100]=>(b11,b8,b5,b2)
Starting SC location of CSI-RS resource #3= [001001001001]=>(b9,b6,b3,b0)
. . .
Starting SC location of CSI-RS resource #11= [100100100100]=>(b11,b8,b5,b2)

According to this, a positioning reference signal pattern may be designed which may meet high requirements and various use cases for 5G NR.

Hereinafter, each embodiment for configuring a positioning reference signal transmission pattern will be described below in detail with reference to the accompanying drawings.

In a third embodiment, the UE may report beam information, which means vertical information, based on the positioning reference signal (PRS) received from the current serving cell. In this case, it is assumed that the base station separately transmits a positioning reference signal (PRS) signal, which is in charge of vertical positioning unlike the existing positioning reference signal in charge of horizontal positioning, to the UE.

In the legacy LTE network, the base station is already aware of the positions of up to 24 neighboring cells adjacent to the serving cell via positioning reference signal configuration information. Further, the base station is also already aware of the RSTD information from each cell via the legacy positioning reference signal (horizontal positioning PRS).

Figure 26:
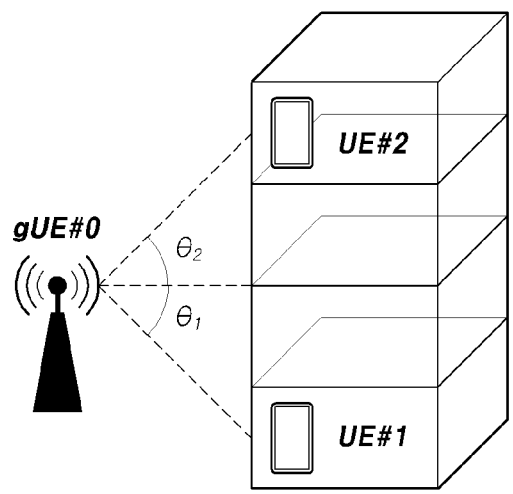
FIG. 26 is a conceptual view illustrating vertical positioning by an angle-of-arrival (AoA) scheme according to an embodiment.

For three-dimensional positioning on the UE, angle-of-arrival (AoA) is needed. AoA estimation in the vertical direction, as shown in FIG. 26, is needed, rather than the AoA for legacy horizontal positioning. With the positioning reference signal in charge of the legacy horizontal positioning, vertical positioning is impossible. Thus, the UE may estimate the corresponding information via beam information given vertical directivity. That is, for vertical positioning, the UE's reporting information needs to include beam information. Because of knowing the horizontal positioning information via the legacy positioning reference signal, the base station may be able to estimate the UE's vertical position based on the beam information.

Vertical positioning may be performed largely in two ways: introducing a new beam-based positioning reference signal pattern for vertical positioning; and utilizing the multiple configuration operation of NR CSI-RS.

To that end, in an embodiment, the base station may transmit a beam-based positioning reference signal for UE vertical positioning.

In this case, for vertical positioning, a new beam-based positioning reference signal may be defined. To that end, there is required the operation of the UE estimating the beam pattern of the vertical positioning positioning reference signal received from each base station in addition to the legacy OTDOA-based horizontal positioning, and the UE may report beam information to the base station in addition to the legacy RSTD value. For example, as shown in FIG. 27, the base station may transmit several beams with specific directivity to the UE, allowing the UE to select a corresponding beam.

Figure 27:
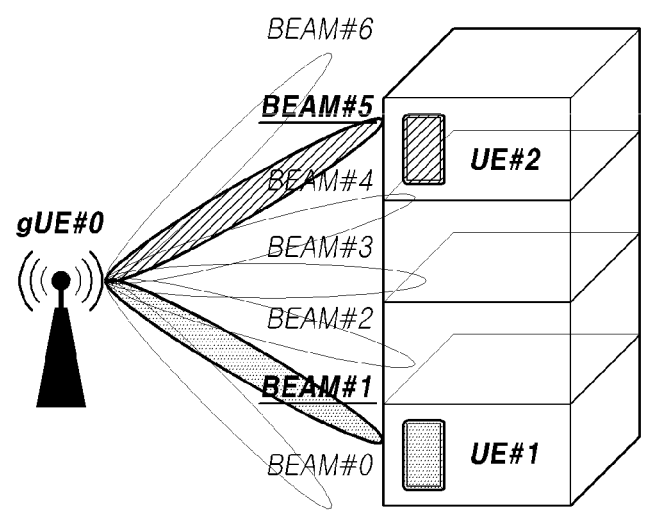
FIG. 27 is a conceptual view illustrating beam-based positioning reference signal transmission according to an embodiment.

As shown in FIG. 27, the UE may report the beam index for the beam where the positioning reference information has been received to the base station. That is, a first UE UE #1 reports beam index #1 to the base station, and a second UE UE #2 reports beam index #5 to the base station.

At this time, to configure the beamformed positioning reference signal in the slot, vertical beamforming alone is applied to the legacy horizontal positioning positioning reference signal or, separately from the legacy horizontal positioning positioning reference signal, a vertical-beamformed positioning reference signal may be defined. This is described below in detail with reference to the relevant drawings.

Figure 28:
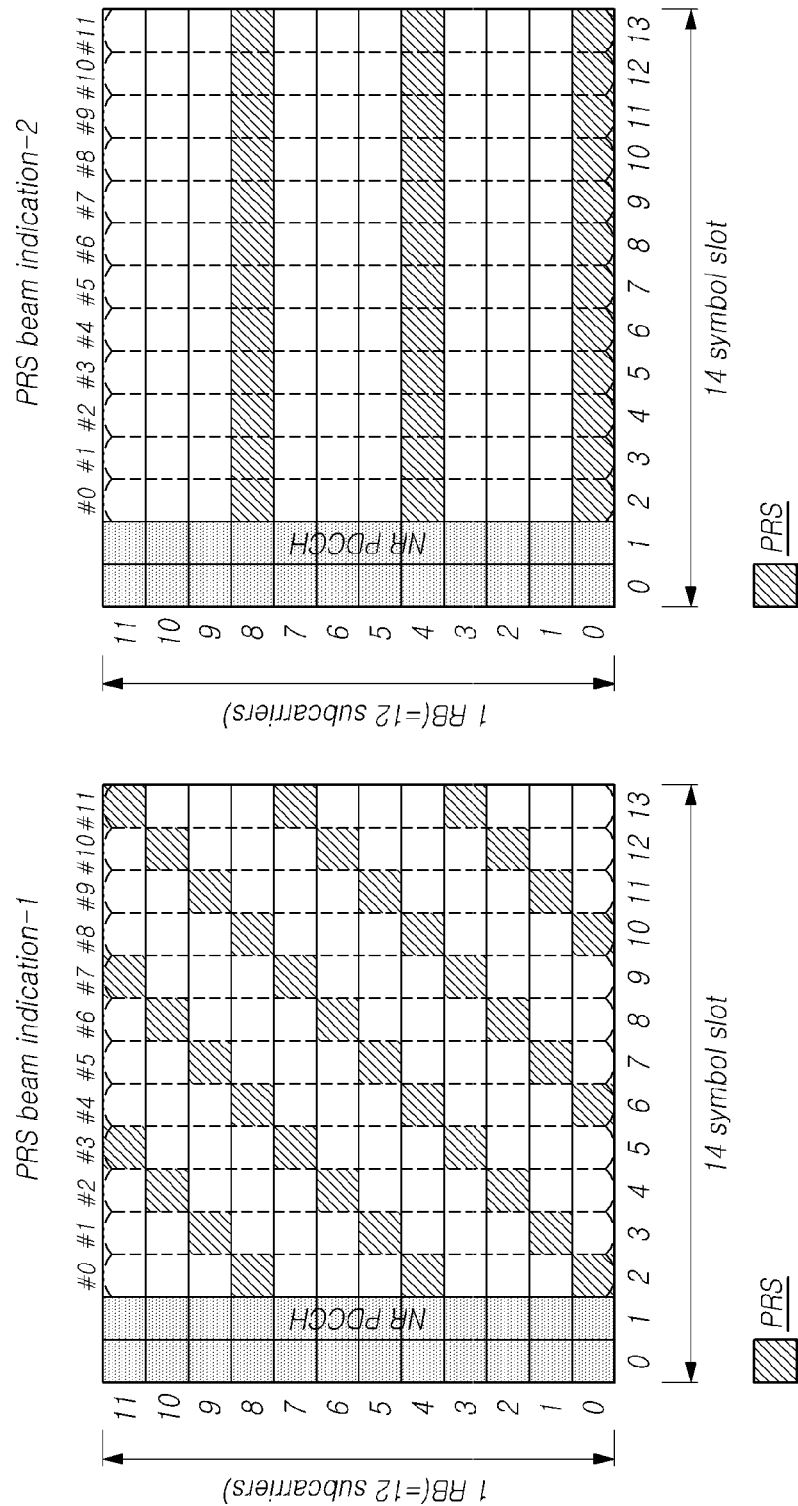
FIG. 28 is a view illustrating an example in which a beam pattern is applied to a pattern of a positioning reference signal according to an embodiment.

For example, the base station may apply vertical beamforming to the legacy horizontal positioning positioning reference signal. That is, this means a method of applying beamforming to the legacy positioning reference signal. For example, it is assumed that an NR positioning reference signal is defined in the slot as shown in FIG. 28. Although the NR positioning reference signal (PRS) has selected pattern-1(distributed) and pattern-2(localized), this is merely an example, and without limitations thereto, the actual NR positioning reference signal pattern may be configured to differ.

In this case, different beams may be applied per OFDM symbol in slot. Since different beams are applied for the maximum $N_{sym}(=14)$ in slot, the UE may estimate directivity for $N_{sym}$ beams. For example, the PRS message information that the UE reports to the base station may be configured as shown in Table 13 below. In addition to the legacy RSTD value, the UE may report the beam index estimated per cell to the base station.

TABLE 13

Example of NR PRS reporting message configuration
Example of NR PRS reporting message configuration

| Cell list | Reported Value (00000-12711), T | Beam index (or Symbol index with best beam) |
|---|---|---|
| Cell_00 | RSTD_xxxxx | PRS_beam_yy |
| Cell_01 | RSTD_xxxxx | PRS_beam_yy |
| ... | ... | ... |

In FIG. 28, since it is assumed that the NR positioning reference signal (PRS) basically performs single port transmission, it is assumed that only one beam index may be derived in units of symbols. However, if the NR positioning reference signal is transmitted on a per-multiport basis, a different beamformed positioning reference signal may be transmitted per port so that the number of beams that may be estimated per UE slot may increase.

Further, signaling of the corresponding positioning reference signal configuration needs to be partially changed or added. For example, referring to FIG. 29, in the positioning reference signal configuration information, vertical beam information, such as prs_beam_v, may be added to the corresponding positioning reference signal configuration information. Thus, the UE may be aware whether there is positioning reference signal beam configuration. Further, upon reporting beam detection to the base station based on the positioning reference signal configuration information, the UE may transfer vertical positioning information in the following two ways.

For example, the UE may report the positioning reference signal (PRS) vertical beam index corresponding to the beam derived with the best beam according to the vertical beam index preconfigured by the base station to the base station.

As another example, the UE may report the PRS symbol index with the best beam detection to the base station although the UE is unaware of the vertical beam index. Although the UE is not exactly aware of the index of the corresponding beam, the base station may implicitly derive the vertical direction of the UE based on the reported information.

As still another example, the base station may define a vertical beamformed positioning reference signal, separately from the legacy horizontal positioning PRS. In this case, a vertical positioning positioning reference signal transmission interval may be defined separately from the legacy horizontal positioning PRS. That is, the horizontal positioning PRS and the vertical positioning PRS may be configured via different higher layer signaling or may be separately configured in the positioning reference signal configuration information.

In this case, the horizontal positioning PRS and the vertical positioning PRS may be configured in the same slot or may be separately configured in different slots.

Figure 30:
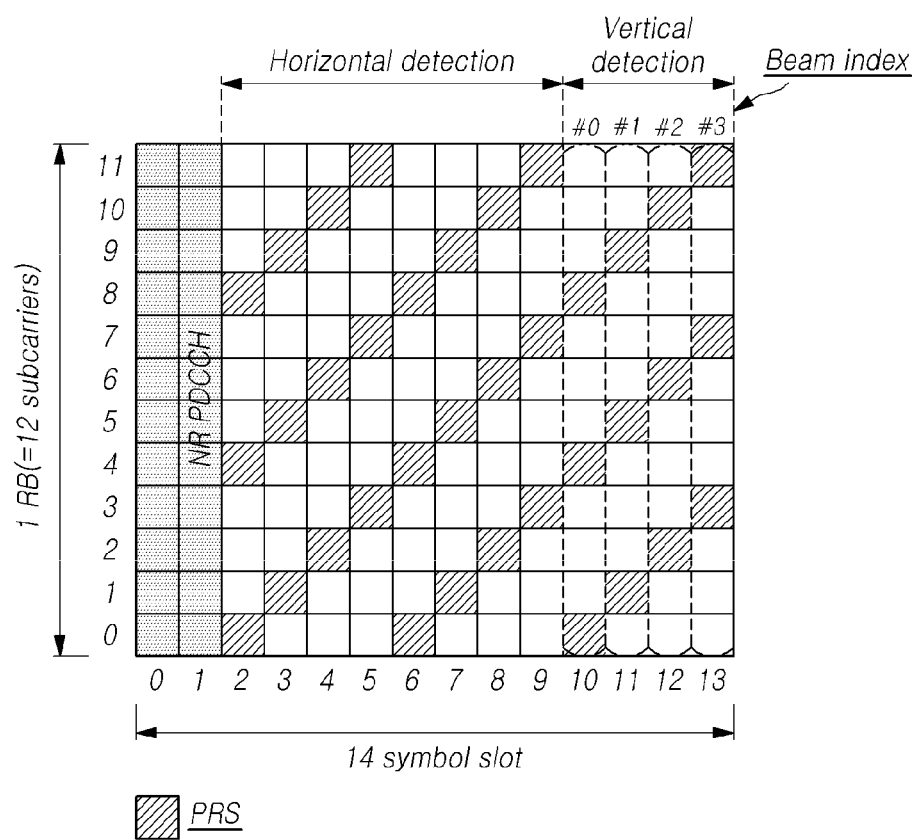
FIG. 30 is a view illustrating an example of simultaneous configuration of horizontal/vertical positioning positioning reference signals in the same slot according to an embodiment.

FIG. 30 illustrates a PRS pattern for explaining a method of configuring the horizontal positioning PRS and the vertical positioning PRS in the same slot. In some interval (from symbol #2 to #9) in the slot, the legacy horizontal positioning PRS may be transmitted and, in another interval (from symbol #10 to #13), the beamformed positioning reference signal may be configured. Information about the horizontal positioning reference signal interval and the vertical positioning reference signal section may be added to the positioning reference signal configuration information.

For example, as shown in FIG. 31, higher layer signaling for the positioning reference signal configuration information may be modified. As a new parameter, prs_H_mapping which indicates the horizontal positioning reference signal interval and prs_V_mapping which indicates the vertical positioning reference signal interval may be added. For example, if the position in slot is provided in the form of a bitmap, the position may be expressed as allocation information composed of $[l_0, l_1, \ldots l_{13}]$. In FIG. 10, the corresponding information is configured as follows. For example, the area including the control resource set (CORESET) may also be configured as the positioning reference signal transmission area.

prs_H_mapping: $[l_0, l_1, \ldots l_{13}]$=[0011111110000]
prs_V_mapping: $[l_0, l_1, \ldots l_{13}]$=[00000000001111]

The corresponding information may also be expressed as PRS_location_length. For example, if prs_H_mapping=8, and prs_V_mapping=4, this means the PRS length in slot of each area set to PDCCH CORSET included/not included. FIG. 30 illustrates an example in which prs_H_mapping=8, and prs_V_mapping=4 under the assumption that the positioning reference signal is configured after CORESET. The order of transmission of Vertical PRS and Horizontal PRS may be freely changed depending on settings.

Further, for example, the horizontal positioning PRS and the vertical positioning PRS may be separately configured in units of slots. Even in this case, what has been described above may apply as it is. However, each transmission unit of positioning reference signal is changed per slot.

According to an embodiment, the base station may transmit the positioning reference signal (PRS) using the multiple CSI-RS resource for UE vertical positioning. In this case, an NR positioning reference signal for vertical positioning may be configured using multiple CSI-RS resources. This means that on the actual physical channel, the positioning reference signal is transmitted via CSI-RS, and the positioning reference signal configuration is performed in higher layer.

To configure the positioning reference signal for vertical positioning in slot using multiple CSI-RS resources, multiple CSI-RS resources may be configured to derive the vertical beam index, or the existing CSI-RS resource which has supported multiple ports may be used to derive the vertical beam index.

Figure 32:
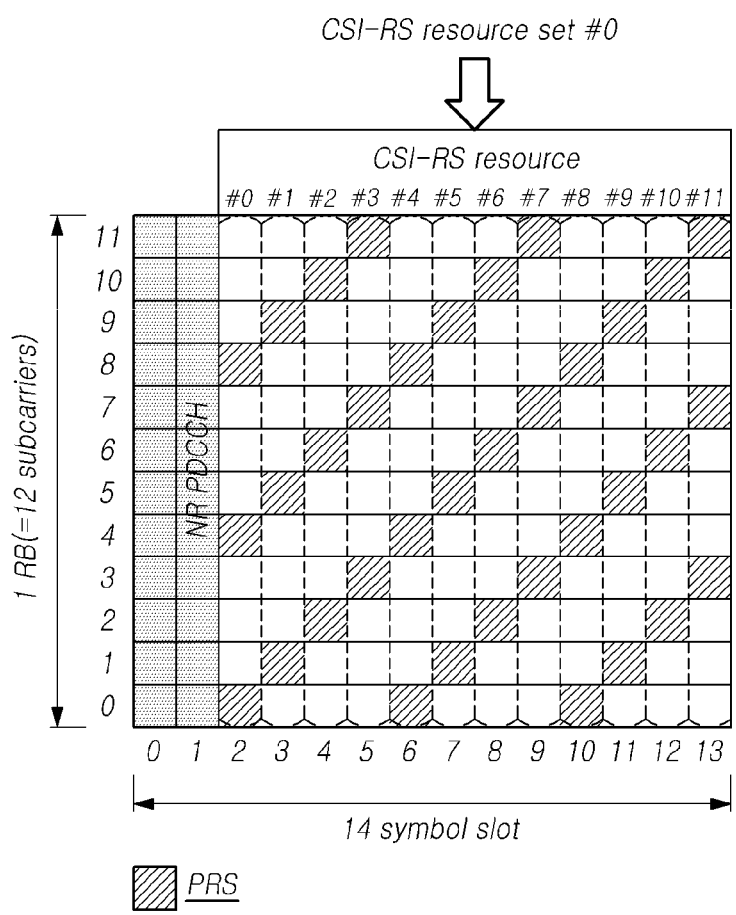
FIG. 32 is a view illustrating an example of a vertical positioning reference signal (PRS) configuration using a single port multiple channel state information reference signal (CSI-RS) resource according to an embodiment.

For example, in the method of configuring multiple CSI-RS resources to derive the vertical beam index, the vertical positioning CSI-RSs may be transmitted, distributed in several CSI-RS resources. As shown in FIG. 32, the vertical positioning reference signal may be mapped to single symbol CSI-RS resources and be transmitted. In this case, different vertical beams may be mapped per CSI-RS resource.

Thus, the UE may transmit the CSI-RS resource index (CRI) for the CSI-RS resource, where its best beam has been derived, to the base station. Thus, the base station may derive the UE vertical positioning. Further, several additional CSI-RS densities may be needed for single symbol CSI-RS. At this time, as shown in Table 12, a CSI-RS pattern with various densities may be additionally configured and utilized (the following two parts ($[b_5 \ldots b_0], [b_2 \ldots b_0]$) in Table 12). Further, the multiple symbol CSI-RS patterns all may be utilized even in which case the value the UE reports to the base station is the same as CRI.

As another example, in the method of deriving the vertical beam index using the existing CSI-RS resource which has supported multiple ports, the multiport CSI-RS of CSI-RS resource may be utilized. In the above-described example, since the CSI-RS resource index (CRI) is reported, reporting is rendered impossible although different beams are applied between the CSI-RS ports. In contrast, the UE may report the CSI-RS port index to the base station, deriving the vertical beam index. Basically, the horizontal positioning PRS estimates the RSTD from each cell based on the OTDOA. High accuracy is required. However, since as high accuracy as the RSTD is not required for the vertical direction beam, although the RS density in slot is low, the influence on the vertical beam estimation may be small. Under such an assumption, the beamformed CSI-RS may be allocated to the multiple ports, and vertical beam estimation may be carried out.

In this case, all existing NR CSI-RS multiport allocation patterns may be used. Table 14 shows NR CSI-RS allocation set forth in TS 38.211. For example, all or some of the CSI-RS patterns in Table 14 may be used.

TABLE 15

Example of NR PRS reporting message configuration (upon using CSI-RS resource)
Example of NR PRS reporting message configuration (upon using CSI-RS resource)

| Cell list | CRI index | CSI-RS port index |
|---|---|---|
| Cell_00 | CRI_xx | Port_yy |
| Cell_01 | CRI_xx | Port_yy |
| ... | ... | ... |

According to this, it is possible to flexibly signal and pattern-design a positioning reference signal for next-generation/5G radio access network to be able to meet high requirements and various use cases requiring three-dimensional positioning.

Hereinafter, hardware structural configurations of a UE and a base station for performing all or some of the embodiments described above in connection with FIGS. 1 to 33 will be described below with reference to the accompanying drawings.

Figure 34:
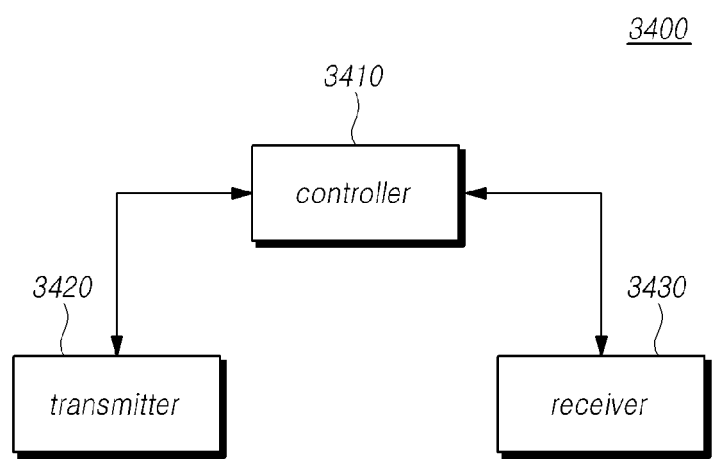
FIG. 34 is a block diagram illustrating a base station according to at least one embodiment of the disclosure.

FIG. 34 is a view illustrating a base station 3400 according to an embodiment.

Referring to FIG. 34, according to an embodiment, a base station 3400 includes a controller 3410, a transmitter 3420, and a receiver 3430.

TABLE 14

CSI-RS locations within a slot

| Row | Parts | Density p | CDMtype | $(\bar{k}, \bar{l})$ | k' | l' |
|---|---|---|---|---|---|---|
| 1 | 1 | 3 | No CDM | $(k_0, l_0), (k_0 + 4, l_0), (k_0 + 8, l_0)$ | 0 | 0 |
| 2 | 1 | 1, 0.5 | No CDM | $(k_0, l_0)$ | 0 | 0 |
| 3 | 2 | 1, 0.5 | FD-CDM2 | $(k_0, l_0)$ | 0, 1 | 0 |
| 4 | 4 | 1 | FD-CDM2 | $(k_0, l_0), (k_0 + 2, l_0),$ | 0, 1 | 0 |
| 5 | 4 | 1 | FD-CDM2 | $(k_0, l_0), (k_0, l_0 + 1),$ | 0, 1 | 0 |
| 7 | 8 | 1 | FD-CDM2 | $(k_0, l_0), (k_0, l_0), (k_2, l_0), (k_3, l_0),$ | 0, 1 | 0 |
| 8 | 8 | 1 | FD-CDM2 | $(k_0, l_0), (k_1, l_0), (k_0, l_0 + 1), (k_1, l_0 + 1)$ | 0, 1 | 0 |
| 9 | 8 | 1 | CDM4 (FD2, TD2) | $(k_0, l_0), (k_1, l_0)$ | 0, 1 | 0, 1 |
| 10 | 12 | 1 | FD-CDM2 | $(k_0, l_0), (k_1, l_0), (k_2, l_0), (k_3, l_0), (k_4, l_0), (k5, l_0)$ | 0, 1 | 0 |
| 11 | 12 | 1 | CDM4 (FD2, TD2) | $(k_0, l_0), (k_1, l_0), (k_2, l_0)$ | 0, 1 | 0, 1 |
| 12 | 16 | 1, 0.5 | FD-CDM2 | $(k_0, l_0), (k_1, l_0), (k_2, l_0), (k_3, l_0),$ $(k_0, l_0 + 1), (k_1, l_0 + 1), (k_02 l_0 + 1), (k_3, l_0 + 1)$ | 0, 1 | 0 |
| 13 | 16 | 1, 0.5 | CDM4 (FD2, TD2) | $(k_0, l_0), (k_1, l_0), (k_2, l_0), (k_3, l_0),$ | 0, 1 | 0, 1 |
| 14 | 24 | 1, 0.5 | FD-CDM2 | $(k_0, l_0), (k_1, l_0), (k_2, l_0), (k_0, l_0 + 1), (k_1, l_0 + 1), (k_2, l_0 + 1),$ $(k_0, l_1), (k_1, l_1), (k_2, l_1), (k_0, l_1 + 1), (k_1, l_1 + 1), (k_2, l_1 + 1)$ | 0, 1 | 0 |
| 15 | 24 | 1, 0.5 | CDM4 (FD2, TD2) | $(k_0, l_0), (k_1, l_0), (k_2, l_0), (k_0, l_1), (k_1, l_1), (k_2, l_1)$ | 0, 1 | 0, 1 |
| 16 | 24 | 1, 0.5 | CDM4 (FD2, TD2) | $(k_0, l_0), (k_1, l_0), (k_2, l_0)$ | 0, 1 | 0, 1, 2, 3 |
| 17 | 32 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1),$ $(k_0, l_1), (k_1, l_1), (k_2, l_1), (k_3, l_1),$ $(k_0, l_1 + 1), (k_1, l_1 + 1), (k_2, l_1 + 1), (k_3, l_1 + 1)$ | 0, 1 | 0 |
| 18 | 32 | 1, 0.5 | CDM4 (FD2, TD2) | $(k_0, l_0), (k_1, l_0), (k_2, l_0), (k_3, l_0), (k_0, l_1), (k_1, l_1), (k_2, l_1),$ $(k_3, l_1)$ | 0, 1 | 0, 1 |
| 19 | 32 | 1, 0.5 | CDM4 (FD2, TD2) | $(k_0, l_0), (k_1, l_0), (k_2, l_0), (k_3, l_0)$ | 0, 1 | 0, 1, 2, 3 |

Figure 33:
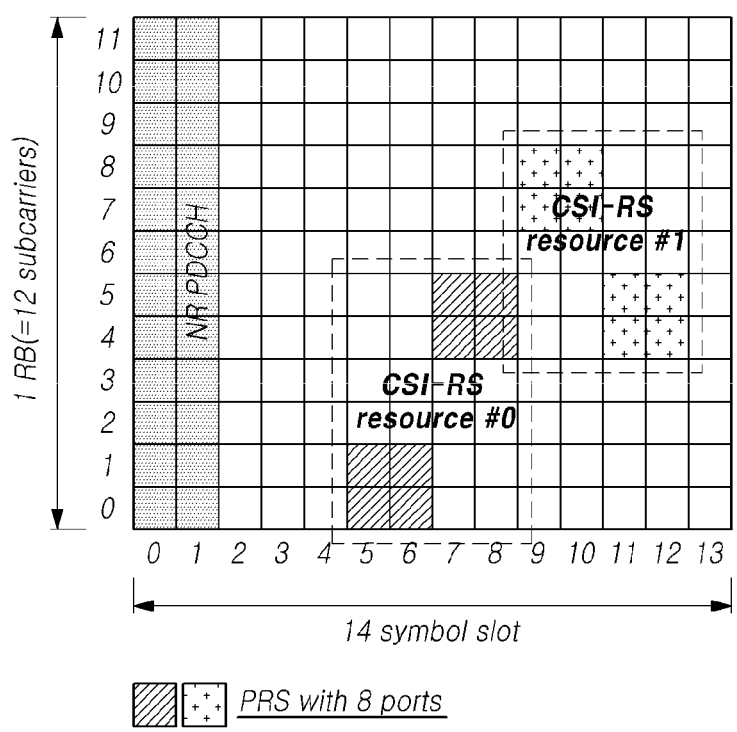
FIG. 33 is a view illustrating an example of an eight-port channel state information reference signal (multiple CSI-RS) resource configuration according to an embodiment.

For example, FIG. 33 illustrates a vertical positioning PRS in the case where two eight-port CSI-RS resources are allocated in slot. Here, since eight CSI-RS ports are allocated to each CSI-RS resource, the positioning reference signal may be transmitted theoretically using a total of 16 different beams. In this case, the information format used in UE reporting, along with the CSI-RS port index meaning the beam index together with the CRI, may be reported as shown in Table 15.

[Table 15] Example of NR PRS Reporting Message Configuration (Upon Using CSI-RS Resource)

The controller 3410 controls the overall operation of the base station 3400 according to a method of performing positioning necessary for performing the disclosure as described above. The controller 3410 may identify configuration information for a positioning reference signal transmission pattern.

According to an embodiment, the transmission pattern of positioning reference signal may be altered via higher layer signaling from the base station depending on the UE's circumstances. In other words, the controller 3410 may select a positioning reference signal transmission pattern suitable for the UE's circumstance. The controller 3410 may transmit configuration information for the selected transmission pattern to the UE via higher layer signaling.

For example, the controller 3410 may configure the configuration information about the positioning reference signal transmission pattern in a plurality of different patterns which differ in at least one of the transmission pattern index, frequency domain allocation information, or time domain allocation information for positioning reference signal transmission. If a transmission pattern suitable for the UE's circumstance is selected from among the plurality of patterns, transmission pattern index for the selected transmission pattern may be included in the configuration information for the positioning reference signal transmission pattern.

Further, the configuration information for the positioning reference signal transmission pattern may include positioning reference signal density information in the frequency domain, which indicates the number of REs configured in one OFDM symbol per physical resource block (PRB). Further, the configuration information for the positioning reference signal transmission pattern may include density information about the positioning reference signal in the time domain, which indicates the number of OFDM symbols where the positioning reference signal is transmitted per slot.

Further, the configuration information for the positioning reference signal transmission pattern may include location information about the positioning reference signal in the time domain, which indicates the position of the OFDM symbol where the positioning reference signal is transmitted. Further, the configuration information for the positioning reference signal transmission pattern may include starting point information in the frequency domain, of the positioning reference signal RE, and starting point information in the time domain, of the OFDM symbol where the transmission of positioning reference signal starts.

That is, according to this, the controller 3410 may configure the positioning reference signal pattern in radio resource via higher layer signaling, in various manners.

According to an embodiment, the controller 3410 may configure the configuration information for positioning reference signal transmission pattern based on configuration information of multiple channel state information reference signal (CSI-RS) resource. In this case, the transmission pattern of the positioning reference signal is transmitted to the UE via higher layer signaling, but the positioning reference signal may be transmitted using the CSI-RS resource. That is, a plurality of CSI-RSs may be configured for transmission of the positioning reference signal.

For example, the controller 3410 may configure various positioning reference signal transmission patterns by allocating a plurality of single symbol CSI-RS pattern-based CSI-RS resources. In this case, the controller 3410 may directly configure CSI-RS pattern configuration information for the CSI-RS resource via higher layer signaling. For example, the bitmap indicating the start position in the time domain and the position in the frequency domain, for the CSI-RS pattern, may be provided by the higher layer parameter.

The transmitter 3420 may transmit the positioning reference signal to the UE based on the transmission pattern configuration information. The transmitter 3420 may transmit the positioning reference signal in the radio resource allocated to transmit the positioning reference signal based on the configuration information for the positioning reference signal transmission pattern. For example, for positioning the UE, the UE may receive a positioning reference signal from each of the serving cell and at least two or more neighboring cells. The UE may measure reference signal time difference information between the received reference signals.

The receiver 3430 may receive the RSTD information for the positioning reference signal from the UE. The controller 3410 may estimate the crossing area based on the RSTD information. Thus, the UE's position may be estimated.

Meanwhile, to measure the vertical position of the UE, it is necessary to configure a positioning reference signal transmission pattern for vertical positioning along with the above-described UE horizontal positioning.

The positioning reference signal transmission pattern may be configured based on beamforming. A horizontal beam and a vertical beam each may be applied to beamforming-based positioning for the UE. The receiver 3430 may receive at least one of the horizontal beam information or vertical beam information configured in the reception of the positioning reference signal, along with the RSTD information, from the UE.

For example, the horizontal beam information may include the horizontal beam index, horizontal angle-of-arrival (AoA) information, and arrival time information. Further, the vertical beam information may include the vertical beam index, vertical AoA information, and arrival time information. The controller 3410 may determine the position of the UE based on the AoA information and arrival information for the corresponding beam.

According to an embodiment, vertical beamforming may be applied to the transmission pattern of the positioning reference signal configured by the above-described higher layer signaling. That is, a different vertical beam may be applied to each symbol in the slot allocated for transmission of the positioning reference signal. To that end, the positioning reference signal configuration information by the higher layer signaling may further include information as to whether a vertical beam is configured.

The receiver 3430 may receive the beam index for the vertical beam applied to the reception of the positioning reference signal, along with the RSTD information, from the UE. For example, the UE may be configured to report the beam index for the vertical beam applied to the reception of the positioning reference signal among the beam indexes pre-configured for the vertical beam.

As another example, the UE may be configured to report the index of the symbol with the best reception quality of positioning reference signal. As described above, since different vertical beams are configured per symbol, the controller 3410 may identify the corresponding vertical beam based on the symbol index and may implicitly estimate the UE's vertical direction.

According to an embodiment, separately from the above-described horizontal positioning reference signal for horizontal positioning, a transmission interval of a vertical beamforming reference signal (beamformed PRS) based on beamforming for vertical positioning may be configured. For example, the vertical positioning reference signal transmission pattern may be configured for some symbols in the same slot. Or, as another example, the horizontal positioning reference signal and the vertical positioning reference signal may be configured for different slots.

Thus, the higher layer signaling indicating the configuration information for the positioning reference signal may include a higher layer parameter to provide the bitmap indicating the positions, in the slot, of the horizontal positioning reference signal and the vertical positioning reference signal.

According to an embodiment, the positioning reference signal may be transmitted based on the configuration information for the multiple CSI-RS resource for vertical positioning. In this case, the transmitter 3420 may transmit the transmission pattern of the positioning reference signal to the UE via higher layer signaling, and the positioning reference signal may be transmitted using the CSI-RS resource. That is, a plurality of CSI-RSs may be configured for transmission of the vertical positioning reference signal.

For example, the controller 3410 may configure various positioning reference signal transmission patterns by allocating a plurality of single symbol CSI-RS pattern-based CSI-RS resources. For example, a different vertical beam may be mapped to each of multiple CSI-RS resources. In this case, the UE may be configured to report the index (CSI-RS resource index (CRI)) for the CSI-RS resource with the best reception quality of vertical positioning reference signal.

Or, For example, the controller 3410 may allocate a beamforming-based CSI-RS (beamformed CSI-RS) to multiple ports. In this case, the UE may be configured to report the port index for the port allocated to the CSI-RS, along with the CRI.

Thus, a flexible transmission pattern of positioning reference signal may be configured to perform positioning in the next-generation wireless network, so that the positioning reference signal may be transmitted according to the transmission pattern suitable for various use scenarios.

Figure 35:
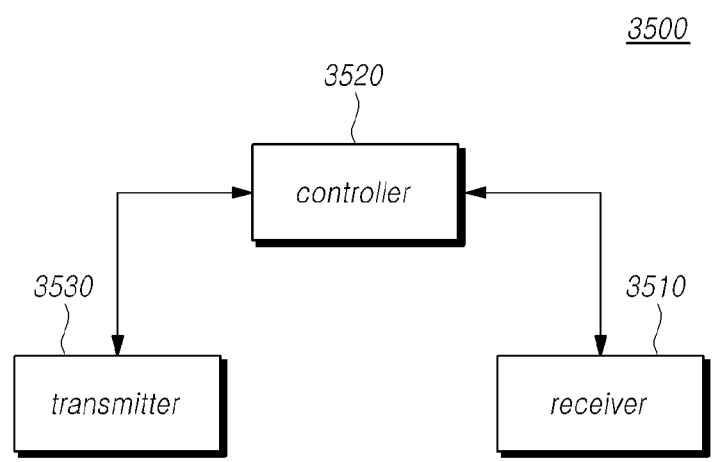
FIG. 35 is a block diagram illustrating a user equipment according to at least one embodiment of the disclosure.

FIG. 35 is a view illustrating a UE 3500 according to an embodiment.

Referring to FIG. 35, according to an embodiment, the UE 3500 includes a receiver 3510, a controller 3520, and a transmitter 3530.

The controller 3520 may identify configuration information for a positioning reference signal transmission pattern.

According to an embodiment, the transmission pattern of positioning reference signal may be altered via higher layer signaling from the base station depending on the UE's circumstances. That is, a positioning reference signal transmission pattern suitable for the UE's circumstance may be selected by the base station, and the receiver 3510 may receive configuration information about the selected transmission pattern via UE via higher layer signaling.

For example, in the configuration information about the positioning reference signal transmission pattern, at least one of the transmission pattern index, frequency domain allocation information, or time domain allocation information for positioning reference signal transmission may be configured in a plurality of different patterns. If a transmission pattern suitable for the UE's circumstance is selected from among the plurality of patterns, transmission pattern index for the selected transmission pattern may be included in the configuration information for the positioning reference signal transmission pattern.

Further, the configuration information for the positioning reference signal transmission pattern may include positioning reference signal density information in the frequency domain, which indicates the number of REs configured in one OFDM symbol per physical resource block (PRB). Further, the configuration information for the positioning reference signal transmission pattern may include density information about the positioning reference signal in the time domain, which indicates the number of OFDM symbols where the positioning reference signal is transmitted per slot.

Further, the configuration information for the positioning reference signal transmission pattern may include location information about the positioning reference signal in the time domain, which indicates the position of the OFDM symbol where the positioning reference signal is transmitted. Further, the configuration information for the positioning reference signal transmission pattern may include starting point information in the frequency domain, of the positioning reference signal RE, and starting point information in the time domain, of the OFDM symbol where the transmission of positioning reference signal starts.

That is, this enables configuration of various positioning reference signal patterns in the radio resource via higher layer signaling as compared with the typical art in which only a single pattern is applied to the positioning reference signal.

According to an embodiment, the configuration information for positioning reference signal transmission pattern may be configured based on configuration information of multiple channel state information reference signal (CSI-RS) resource. In this case, the receiver 3510 may receive the transmission pattern of the positioning reference signal via higher layer signaling and the positioning reference signal using the CSI-RS resource. That is, a plurality of CSI-RSs may be configured for transmission of the positioning reference signal.

For example, various positioning reference signal transmission patterns may be configured by allocating a plurality of single symbol CSI-RS pattern-based CSI-RS resources. In this case, CSI-RS pattern configuration information may be directly configured for the CSI-RS resource via higher layer signaling. For example, the bitmap indicating the start position in the time domain and the position in the frequency domain, for the CSI-RS pattern, may be provided by the higher layer parameter.

The receiver 3510 may receive the positioning reference signal based on the transmission pattern configuration information. The receiver 3510 may receive the positioning reference signal in the radio resource allocated to transmission of the positioning reference signal based on the configuration information for the positioning reference signal transmission pattern. For example, for positioning the UE, the receiver 3510 may receive a positioning reference signal from each of the serving cell and at least two or more neighboring cells. The controller 3520 may measure reference signal time difference information between the received reference signals.

The transmitter 3530 may transmit RSTD information for the positioning reference signals to the base station. The base station may estimate the crossing area based on the RSTD information. Thus, the UE's position may be estimated.

Meanwhile, to measure the vertical position of the UE, it is necessary to configure a positioning reference signal transmission pattern for vertical positioning along with the above-described UE horizontal positioning.

The positioning reference signal transmission pattern may be configured based on beamforming. A horizontal beam and a vertical beam each may be applied to beamforming-based positioning for the UE. The transmitter 3530 may report at least one of the horizontal beam information or vertical beam information configured in the reception of the positioning reference signal, along with the RSTD information, to the base station.

For example, the horizontal beam information may include the horizontal beam index, horizontal angle-of-arrival (AoA) information, and arrival time information. Further, the vertical beam information may include the vertical beam index, vertical AoA information, and arrival time information. The base station may determine the position of the UE based on the AoA information and arrival information for the corresponding beam.

According to an embodiment, vertical beamforming may be applied to the transmission pattern of the positioning reference signal configured by the above-described higher layer signaling. That is, a different vertical beam may be applied to each symbol in the slot allocated for transmission of the positioning reference signal. To that end, the positioning reference signal configuration information by the higher layer signaling may further include information as to whether a vertical beam is configured.

The transmitter 3530 may report the beam index for the vertical beam applied to the reception of the positioning reference signal, along with the RSTD information, to the base station. For example, the transmitter 3530 may be configured to report the beam index for the vertical beam applied to the reception of the positioning reference signal among the beam indexes pre-configured for the vertical beam.

As another example, the transmitter 3530 may be configured to report the index of the symbol with the best reception quality of positioning reference signal. As described above, since different vertical beams are configured per symbol, the base station may identify the corresponding vertical beam based on the symbol index and may implicitly estimate the UE's vertical direction.

According to an embodiment, separately from the above-described horizontal positioning reference signal for horizontal positioning, a transmission interval of a vertical beamforming reference signal (beamformed PRS) based on beamforming for vertical positioning may be configured. For example, the vertical positioning reference signal transmission pattern may be configured for some symbols in the same slot. Or, as another example, the horizontal positioning reference signal and the vertical positioning reference signal may be configured for different slots.

Thus, the higher layer signaling indicating the configuration information for the positioning reference signal may include a higher layer parameter to provide the bitmap indicating the positions, in the slot, of the horizontal positioning reference signal and the vertical positioning reference signal.

According to an embodiment, the positioning reference signal may be transmitted based on the configuration information for the multiple CSI-RS resource for vertical positioning. In this case, the receiver 3510 may receive the transmission pattern of the positioning reference signal via higher layer signaling and the positioning reference signal using the CSI-RS resource. That is, a plurality of CSI-RSs may be configured for transmission of the vertical positioning reference signal.

For example, various positioning reference signal transmission patterns may be configured by allocating a plurality of single symbol CSI-RS pattern-based CSI-RS resources. For example, a different vertical beam may be mapped to each of multiple CSI-RS resources. In this case, the transmitter 3530 may be configured to report the index (CSI-RS resource index (CRI)) for the CSI-RS resource with the best reception quality of vertical positioning reference signal.

Or, For example, a beamforming-based CSI-RS (beamformed CSI-RS) may be allocated to multiple ports. In this case, the transmitter 3530 may be configured to report the port index for the port allocated to the CSI-RS, along with the CRI.

Thus, a flexible transmission pattern of positioning reference signal may be configured to perform positioning in the next-generation wireless network, so that the positioning reference signal may be transmitted according to the transmission pattern suitable for various use scenarios.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the disclosure shall be construed on the basis of the accompanying claims in such a manner that all of the technical ideas included within the scope equivalent to the claims belong to the disclosure.

The invention claimed is:
1. A method for performing positioning by a user equipment (UE), the method comprising:
receiving configuration information for a resource of a positioning reference signal (PRS);
receiving the positioning reference signal based on the configuration information for the resource; and transmitting reference signal time difference (RSTD) information for the positioning reference signal to a base station, wherein:

the transmitting of the RSTD information includes further transmitting at least one of vertical beam information and horizontal beam information configured to reception of the positioning reference signal, the horizontal beam information includes a horizontal beam index, horizontal angle-of-arrival (AoA) information, and arrival time information, and the vertical beam information includes a vertical beam index, vertical AoA information, and arrival time information.

2. The method of claim 1, wherein
the configuration information for the resource of the positioning reference signal is configured via higher layer signaling.

3. The method of claim 1, wherein
the configuration information for the resource of the positioning reference signal includes density information and starting point information of the positioning reference signal in frequency domain, where the density information indicates a number of resource elements (REs) configured in one orthogonal frequency division multiplexing (OFDM) symbol per physical resource block (PRB), and the starting point information indicates a resource element where transmission of a positioning reference signal starts.

4. The method of claim 1, wherein
the configuration information for the resource of the positioning reference signal includes density information and starting point information of the positioning reference signal in time domain, where the density information indicates a number of orthogonal frequency division multiplexing (OFDM) symbols where a positioning reference signal is transmitted per slot, and the starting point information indicates the OFMM symbol where transmission of positioning reference signal starts.

5. A method for performing positioning by a base station, the method comprising:

configuring configuration information for a resource of a positioning reference signal (PRS);

transmitting the positioning reference signal based on the configuration information for the resource; and receiving reference signal time difference (RSTD) information for the positioning reference signal, wherein:

the receiving of the RSTD information includes further receiving at least one of vertical beam information and horizontal beam information configured to reception of the positioning reference signal, the horizontal beam information includes a horizontal beam index, horizontal angle-of-arrival (AoA) information, and arrival time information, and the vertical beam information includes a vertical beam index, vertical AoA information, and arrival time information.

6. The method of claim 5, wherein
the configuration information for the resource of the positioning reference signal is configured via higher layer signaling.

7. The method of claim 5, wherein
the configuration information for the resource of the positioning reference signal includes density information and starting point information of the positioning reference signal in frequency domain, where the density information indicates a number of resource elements (REs) configured in one orthogonal frequency division multiplexing (OFDM) symbol per physical resource block (PRB), and the starting point information indicates a resource element where transmission of a positioning reference signal starts.

8. The method of claim 5, wherein
the configuration information for the resource of the positioning reference signal includes density information and starting point information of the positioning reference signal in time domain, where the density information indicates a number of orthogonal frequency division multiplexing (OFDM) symbols where a positioning reference signal is transmitted per slot, and the starting point information indicates the OFMM symbol where transmission of positioning reference signal starts.

9. A UE performing positioning, the UE comprising:

a receiver receiving a configuration information for a resource of a positioning reference signal (PRS) and receiving the positioning reference signal based on the configuration information for the resource;

a controller controlling an operation of the receiver: and a transmitter transmitting reference signal time difference (RSTD) information for the positioning reference signal to a base station, wherein:

the transmitter further transmits at least one of vertical beam information and horizontal beam information configured to reception of the positioning reference signal, the horizontal beam information includes a horizontal beam index, horizontal angle-of-arrival (AoA) information, and arrival time information, and the vertical beam information includes a vertical beam index, vertical AoA information, and arrival time information.

10. The UE of claim 9, wherein
the configuration information for the resource of the positioning reference signal is configured via higher layer signaling.

11. The UE of claim 9, wherein
the configuration information for the resource of the positioning reference signal includes density information and starting point information of the positioning reference signal in frequency domain, where the density information indicates a number of resource elements (REs) configured in one orthogonal frequency division multiplexing (OFDM) symbol per physical resource block (PRB), and the starting point information indicates a resource element where transmission of a positioning reference signal starts.

12. The UE of claim 9, wherein
the configuration information for the resource of the positioning reference signal includes density information and starting point information of the positioning reference signal in time domain, where the density information indicates a number of orthogonal frequency division multiplexing (OFDM) symbols where a positioning reference signal is transmitted per slot, and the starting point information indicates the OFMM symbol where transmission of positioning reference signal starts.

* * * * *